United States Patent
Dawid et al.

(10) Patent No.: US 10,405,171 B2
(45) Date of Patent: Sep. 3, 2019

(54) COMMUNICATION TERMINAL AND METHOD FOR COMMUNICATING DATA

(71) Applicant: Intel IP Corporation, Santa Clara, CA (US)

(72) Inventors: Herbert Dawid, Herzogenrath (DE); Tobias Scholand, Essen (DE); Michael Speth, Krefeld (DE); Roland Hellfajer, Bochum (DE); Markus Jordan, Gelsenkirchen (DE); Edgar Bolinth, Korschenbroich (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/758,740

(22) PCT Filed: Aug. 24, 2016

(86) PCT No.: PCT/US2016/048248
§ 371 (c)(1),
(2) Date: Mar. 9, 2018

(87) PCT Pub. No.: WO2017/052906
PCT Pub. Date: Mar. 30, 2017

(65) Prior Publication Data
US 2019/0037386 A1    Jan. 31, 2019

(30) Foreign Application Priority Data
Sep. 25, 2015 (DE) .................. 10 2015 116 288

(51) Int. Cl.
*H04W 8/18* (2009.01)
*H04W 76/10* (2018.01)
(Continued)

(52) U.S. Cl.
CPC .......... *H04W 8/183* (2013.01); *H04W 28/14* (2013.01); *H04W 36/023* (2013.01);
(Continued)

(58) Field of Classification Search
None
See application file for complete search history.

(56) References Cited

U.S. PATENT DOCUMENTS

| | | | |
|---|---|---|---|
| 2011/0280166 A1 | 11/2011 | Nien et al. | |
| 2012/0021726 A1* | 1/2012 | Fu | H04W 8/205 455/412.1 |

(Continued)

FOREIGN PATENT DOCUMENTS

| | | |
|---|---|---|
| EP | 2512184 A1 | 10/2012 |
| WO | 2013124710 A1 | 8/2013 |

OTHER PUBLICATIONS

German Office Action based on application No. 10 2015 116 288.1 (9 pages) dated Apr. 1, 2016 (Reference Purpose Only).
(Continued)

*Primary Examiner* — Saba Tsegaye
(74) *Attorney, Agent, or Firm* — Viering, Jentschura & Partner MBB

(57) ABSTRACT

A communication terminal is described with a controller configured to receive, from applications, respective requests for an exchange of application layer data over a communication network associated with the respective application, to select a first application, to control a communication circuit to perform an exchange according to the request received from the first application, to initiate, for a second application, a buffering of application layer data requested to be exchanged according to the request received from the second application, to control the communication circuit to release the first network layer communication connection
(Continued)

based on a duration of the buffering and to establish a second network layer communication connection to a communication network associated with the second application and perform an exchange according to the request received from the second application over the second network layer communication connection after release of the first network layer communication connection.

20 Claims, 15 Drawing Sheets

(51) Int. Cl.
  *H04W 28/14* (2009.01)
  *H04W 88/06* (2009.01)
  *H04W 36/02* (2009.01)
  *H04W 76/20* (2018.01)
  *H04W 76/34* (2018.01)
  *H04W 76/15* (2018.01)

(52) U.S. Cl.
  CPC ........... *H04W 76/10* (2018.02); *H04W 76/20* (2018.02); *H04W 76/15* (2018.02); *H04W 76/34* (2018.02); *H04W 88/06* (2013.01)

(56) References Cited

U.S. PATENT DOCUMENTS

| | | | |
|---|---|---|---|
| 2012/0190362 A1 | 7/2012 | Subbarayudu et al. | |
| 2013/0012135 A1 | 1/2013 | Ruohonen et al. | |
| 2013/0210484 A1 | 8/2013 | Jeenagala et al. | |
| 2013/0272251 A1 | 10/2013 | Schmidt et al. | |
| 2013/0329639 A1 | 12/2013 | Wietfeldt et al. | |
| 2014/0119345 A1 | 5/2014 | Sikri et al. | |
| 2014/0220981 A1 | 8/2014 | Jheng et al. | |
| 2014/0274051 A1 | 9/2014 | Hsu et al. | |
| 2015/0023217 A1 | 1/2015 | Hu et al. | |
| 2015/0023258 A1 | 1/2015 | Hu et al. | |
| 2015/0031408 A1 | 1/2015 | Kalla et al. | |
| 2015/0264640 A1* | 9/2015 | Feng ..................... | H04W 8/183 455/558 |
| 2015/0373667 A1* | 12/2015 | Rajurkar ............... | H04W 68/12 455/458 |
| 2016/0105925 A1* | 4/2016 | Wang ................... | H04B 5/0031 455/41.1 |

OTHER PUBLICATIONS

International Search Report based on apllication No. PCT/US2016/048248 (9 pages) dated Dec. 14, 2016 (Reference Purpose Only).
ETSI, "LTE; Evolved Universal Terrestrial Radio Access (E-UTRA); Radio Resource Control (RRC); Protocol specification", 3GPP TS 36.331, Jul. 2015, 582 pages, version 12.6.0 Release 12.
ETSI, "Universal Mobile Telecommunications System (UMTS); Radio Resource Control (RRC); Protocol specification", 3GPP TS 25.331, Jul. 2015, 2248 pages, version 12.6.0 Release 12.
"Fast Dormancy", retrieved Sep. 25, 2015, from http://www.sharetechnote.com/htmlHandbook_UMTS_FastDormancy.html.
Supplementary European Search Report based on Application No. EP20160849249 (2 pages) dated Apr. 8, 2019 (for reference purpose only).

* cited by examiner

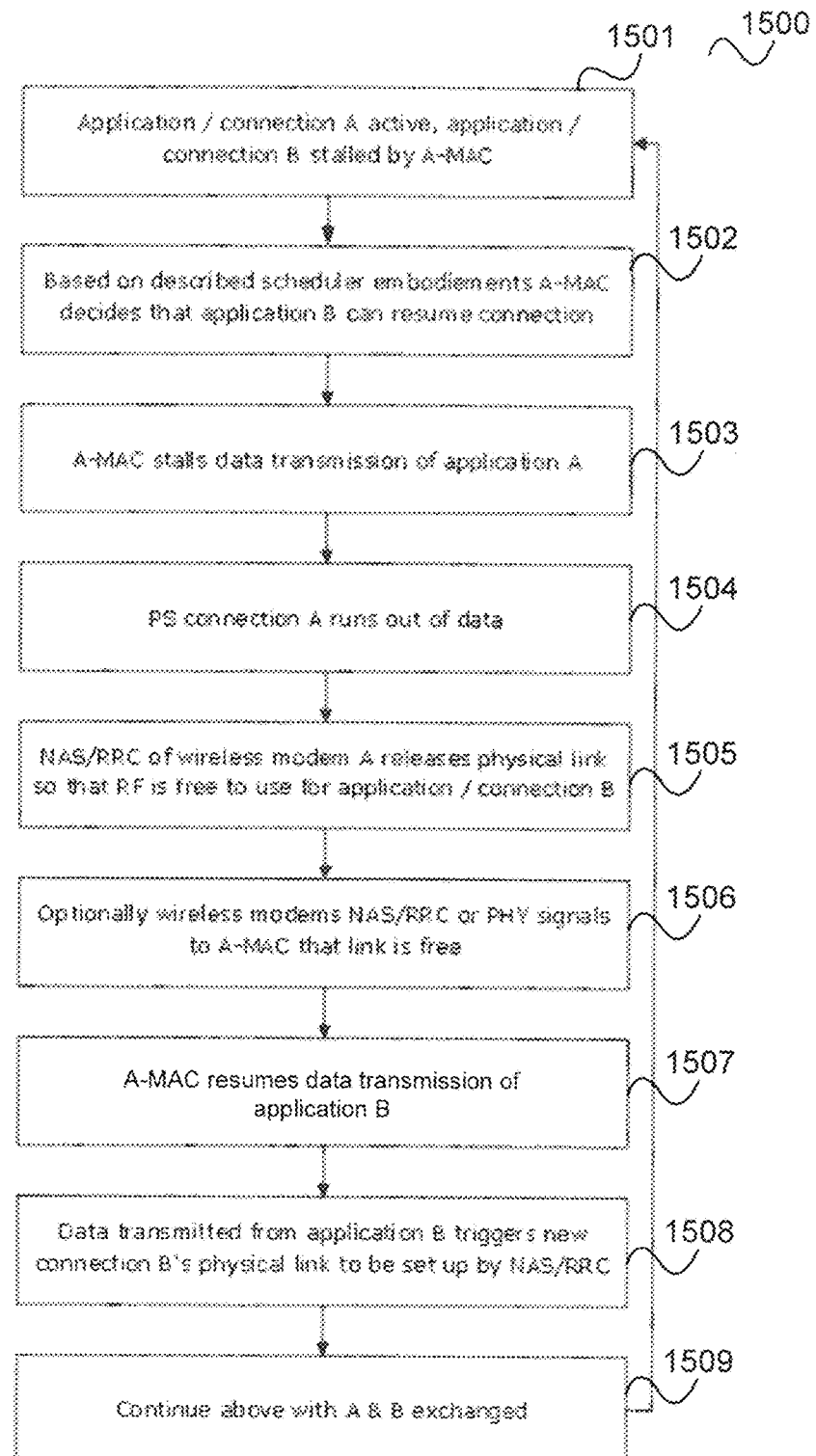

COMMUNICATION TERMINAL AND METHOD FOR COMMUNICATING DATA

RELATED APPLICATIONS

The present application is a national stage entry according to 35 U.S.C. § 371 of PCT application No.: PCT/US2016/048248 filed on Aug. 24, 2016, which claims priority from German application No.: 10 2015 116 288.1 filed on Sep. 25, 2015, and is incorporated herein by reference in its entirety.

TECHNICAL FIELD

Embodiments described herein generally relate to communication terminals and methods for communicating data.

BACKGROUND

A subscriber terminal of a cellular communication network may have two SIM cards. However, to save costs, a subscriber terminal having two SIM cards may be equipped with only a single radio transmitter which thus needs to be shared by the two SIM cards. Accordingly, efficient approaches which allow communication via both SIM cards in such a scenario are desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which:

FIG. 15 shows a flow diagram giving an example for a RF resource access scheduling by the A-MAC.

DESCRIPTION OF EMBODIMENTS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
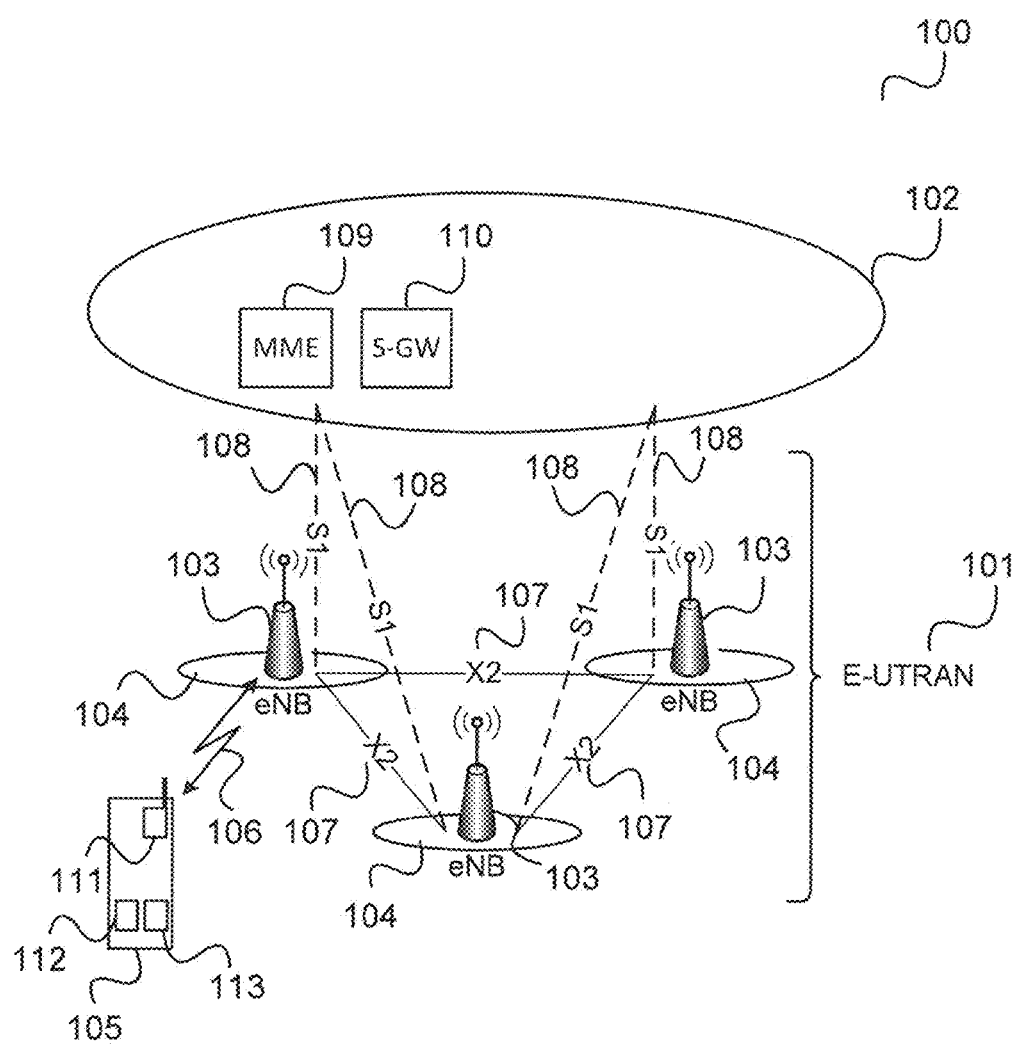
FIG. 1 shows a communication system, e.g. an LTE (Long Term Evolution) communication system.

FIG. 1 shows a communication system 100, e.g. an LTE (Long Term Evolution) communication system.

The communication system 100 includes a radio access network (e.g. an E-UTRAN, Evolved UMTS (Universal Mobile Communications System) Terrestrial Radio Access Network according to LTE) 101 and a core network (e.g. an EPC, Evolved Packet Core, according LTE) 102. The radio access network 101 may include base (transceiver) stations (e.g. eNodeBs, eNBs, according to LTE) 103. Each base station 103 provides radio coverage for one or more mobile radio cells 104 of the radio access network 101.

A mobile terminal (also referred to as UE, user equipment, or MS, mobile station) 105 located in a mobile radio cell 104 may communicate with the core network 102 and with other mobile terminals 105 via the base station providing coverage in (in other words operating) the mobile radio cell.

Control and user data are transmitted between a base station 103 and a mobile terminal 105 located in the mobile radio cell 104 operated by the base station 103 over the air interface 106 on the basis of a multiple access method.

The base stations 103 are interconnected with each other by means of a first interface 107, e.g. an X2 interface. The base stations 103 are also connected by means of a second interface 108, e.g. an S1 interface, to the core network, e.g. to an MME (Mobility Management Entity) 109, and a Serving Gateway (S-GW) 110. For example, the MME 109 is responsible for controlling the mobility of mobile terminals located in the coverage area of E-UTRAN, while the S-GW 110 is responsible for handling the transmission of user data between mobile terminals 105 and core network 102.

The radio access network 101 and the core network may support communication according to various communication technologies, e.g. mobile communication standards. For example, each base station 103 may provide a radio communication connection via the air interface between itself and the mobile terminal 105 according to LTE, UMTS, GSM (Global System for Mobile Communications), EDGE (Enhanced Data Rates for GSM Evolution) radio access. Accordingly, the radio access network 102 may operate as an E-UTRAN, a UTRAN, a GSM radio access network, or a GERAN (GSM EDGE Radio Access Network). Analogously, the core network 102 may include the functionality of an EPC, a UMTS core network or a GSM core network.

For uplink radio communication via the air interface 106, the mobile terminal 105 includes a radio transmitter (TX RF) 111.

Data transmission between the mobile terminal 105 and the corresponding base station 103 (i.e. the base station operating the radio cell in which the mobile terminal 105 is located) is carried out in accordance with a (radio) frame structure. An example of a frame structure is shown in FIG. 2.

Figure 2:
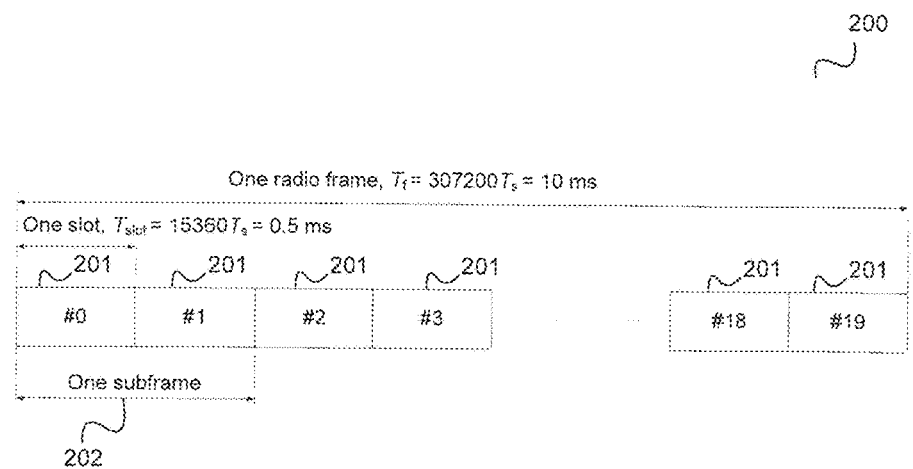
FIG. 2 shows a frame of an exemplary frame structure.

FIG. 2 shows a frame 200 of an exemplary frame structure.

The frame 200 may be used for both full-duplex and half-duplex FDD. The frame 200 is 10 ms long and consists of 20 slots 201 of length 0.5 ms, numbered from 0 to 19. A subframe 202 is defined as two consecutive slots 201. In each 10 ms interval ten subframes 202 are available for downlink transmissions or uplink transmissions, i.e. as time transmission intervals (TTI). It should however be noted that according to other radio access technologies like e.g. WIFI, a frame may have a different number of subframes than ten and a subframe may include more than two slots.

Uplink and downlink transmissions are separated in the frequency domain. Depending on the slot format a subframe 202 may include 12 or 14 OFDM (orthogonal frequency division multiple access) symbols in DL (downlink) and 12 or 14 SC-FDMA symbols in UL (uplink), respectively.

The mobile terminal 105 may include an identity module 112 (e.g. implemented by a chip card) that allows the mobile terminal 105 to identify itself as a subscriber of the communication network (e.g. as an LTE subscriber) formed by the radio access network 101 and the core network 102 and thus to use the communication network as a home network.

The mobile terminal 105 may include a further identity module 113, i.e. may be a multi-SIM device that allows the mobile terminal 105 also to use another communication network (e.g. WCDMA (Wideband Code Division Multiple Access) network such as a UMTS network) since in practice, a plurality of cellular communication networks are provided by different operators and according to different radio access technologies (e.g. LTE and UMTS) such that the coverage areas of the communication networks overlap, i.e. a mobile terminal may be located within a radio cell 104 operated by a base station 103 belonging to a first communication network of a first operator according to a first radio access technology (e.g. LTE) and at the same time be located within a radio cell operated by a base station 103 belonging to a second communication network of a second operator according to a second radio access technology (e.g. UMTS). This is illustrated in FIG. 3.

Figure 3:
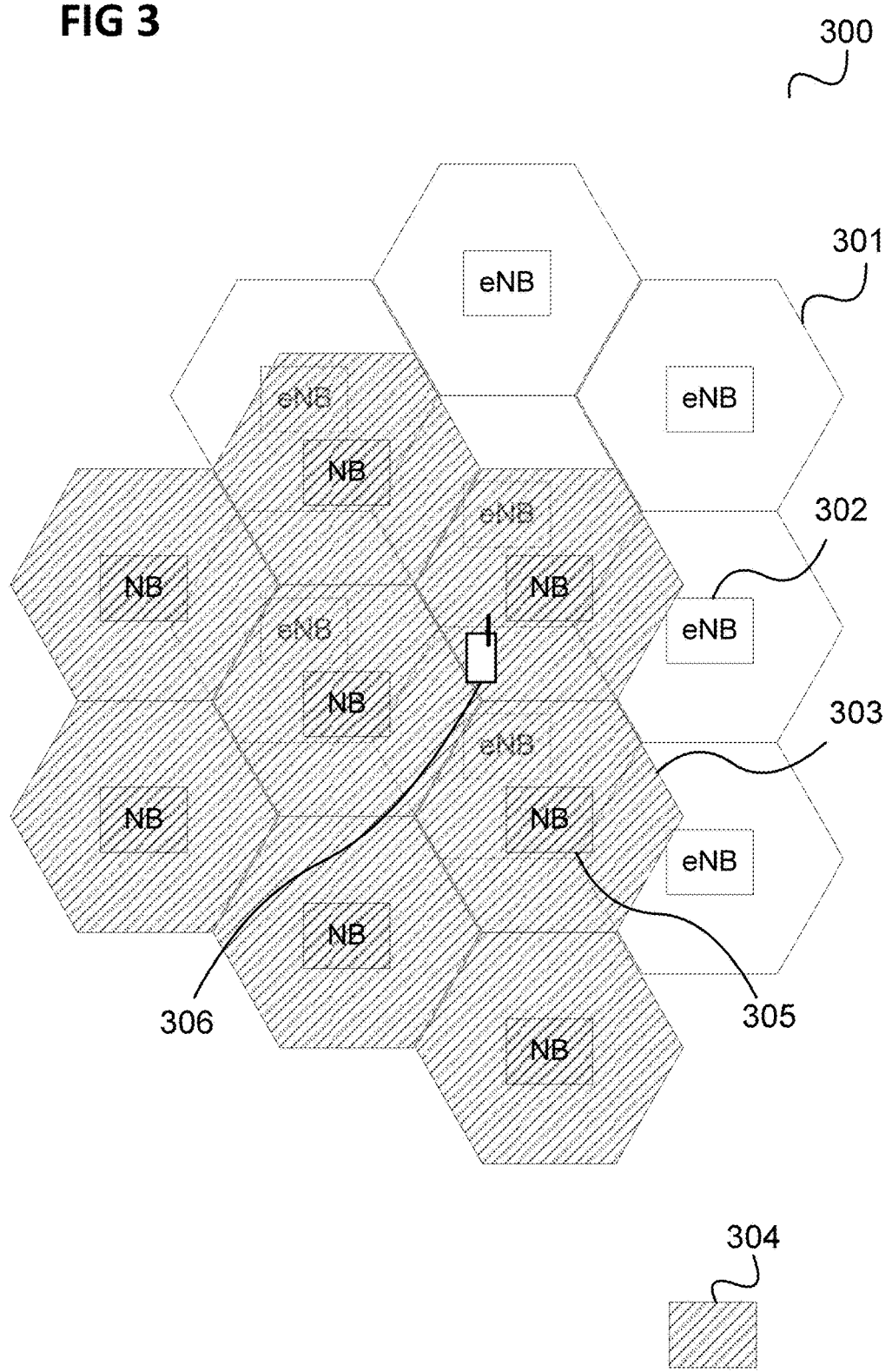
FIG. 3 shows a radio cell arrangement.

FIG. 3 shows a radio cell arrangement 300 according to an embodiment.

The radio cell arrangement 300 includes a first plurality of radio cells 301 (shown without hatching) operated by a plurality of first base stations 302 of a first communication network (e.g. LTE base stations eNB), and a second plurality of radio cells 303 indicated by a hatching 304 operated by a plurality of second base stations 305 of a second communication network (e.g. UMTS base stations NB).

As illustrated, the second plurality of radio cells 303 overlaps the first plurality of radio cells 304 such that a mobile terminal 306, e.g. corresponding to mobile terminal 105, located in the overlapping area may connect to both the first communication network and the second communication network, e.g. may both register with a base station 302 of the first communication network and a base station 305 of the second communication network.

The mobile terminal 306 may communicate with the first communication network by means of its LTE identity module 112, i.e. under the subscription of its first identity module 112, and may communicate with the second communication network by means of its UMTS identity module 113, i.e. under the subscription of its second identity module 112.

Dual-SIM devices such as the mobile terminal 306 or even Multi-SIM devices with more than two SIMs are gaining considerable market traction. First generations of implementations focused on DSDS (Dual SIM Dual Standby) functionality only, i.e. both SIM cards (which are possibly even from different operators, hence the SIM cards have neither the Radio Access Technology (RAT), nor the used frequency in common) can be in paging state simultaneously, but one SIM goes out-of-service as soon as the other SIM enters a call.

Figure 4:
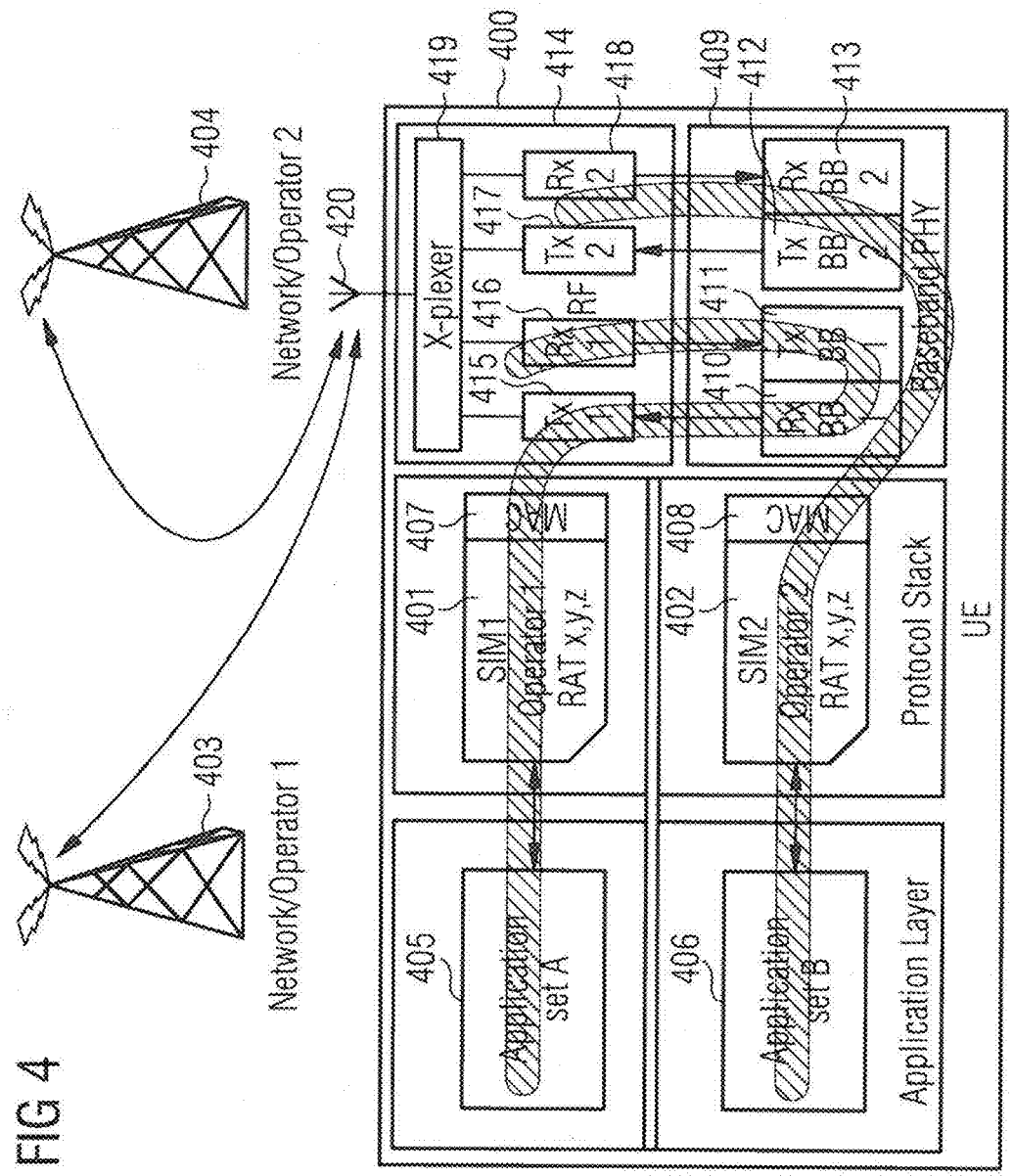
FIG. 4 shows a dual-SIM mobile terminal with a dual (RF) transmit and receive chain.

More advanced schemes include from DR-DSDS (Dual Receive DSDS which require the mobile terminal to have with two independent receive chains) up to DSDA (Dual SIM Dual Active) where both SIMs can even run two calls simultaneously (which usually implies that the mobile terminal includes two independent transmit chains as well). Since multiple voice calls in parallel are hard to imagine as a common use case, one might argue that DSDA will not considerably improve user experience over DR-DSDS. However, two times packed switched (PS) data on both SIMs, or even packed switched voice (VoIP, VoLTE) on one SIM and PS data on the other SIM represent quite common use cases in Multi-SIM capable mobile phones, which makes DSDA an important feature. As illustrated in FIG. 4, different sets of applications using packed switched data transfer may be running in parallel on two SIMs.

FIG. 4 shows a dual-SIM mobile terminal 400 with a dual (RF) transmit and receive chain.

The mobile terminal 400 includes a first SIM 401 for usage of a first communication network of a first operator including a first base station 403, e.g. corresponding to one of the base stations 305 (e.g. a UMTS SIM) and a second SIM 402 for usage of a second communication network of a second operator including a second base station 404, e.g. corresponding to one of the base stations 302 (e.g. an LTE SIM).

A first set of applications 405 communicates via the first SIM 401, i.e. communicates via the first communication network under the subscription of the first SIM 401. A second set of applications 406 communicates via the second SIM 402, i.e. communicates via the second communication network under the subscription of the second SIM 402. The applications 405, 406 are located on the application layer, e.g. according to the ISO/OSI reference model. The SIMs 401, 402 can be seen to be part of the protocol stack, which also provides a respective MAC layer 407, 408.

The mobile terminal 400 includes a baseband circuit 409 which includes a receive (RX) baseband unit 410 and a transmit (TX) baseband unit 411 for the first SIM as well as a receiver baseband unit 412 and a transmit baseband unit 413 for the second SIM. This means that the mobile terminal can handle baseband RX and TX processing for both SIMs 401, 402 in parallel.

In this example, it is further assumed that the mobile terminal 400 includes an RF unit 414 which includes a receive RF path 415 and a transmit RF path 416 for the first SIM as well as a receive RF path 417 and a transmit RF path 418 for the second SIM. This means that the mobile terminal 400 is equipped with an RF transmit chain and a TX transmit chain for each SIM and can thus handle RF RX and TX processing for both SIMs 401, 402 in parallel. The RF TX/RX paths 414 to 418 are connected to the respective baseband units 410 to 413 and (e.g. via a Quadplexer 419) to an antenna 420 for radio communication with the base stations 403, 404.

Since the mobile terminal 400 is equipped with a RF transmitter 415, 417 and the RF receiver 416, 418 for each SIM, the SIMs 401, 402 do not need to share the RF transmitter or the RF receiver. However, single receiver and/or transmitter sharing is of particular importance in the implementation of dual SIM devices due to the relatively high cost involved with providing two independent RF receiver and/or RF transmitter chains. However, in a mobile terminal having a single RF receiver and/or a single RF transmitter the single receive and/or transmit resource needs to be shared between the activities of the involved SIM cards which are typically completely asynchronous.

Figure 5:
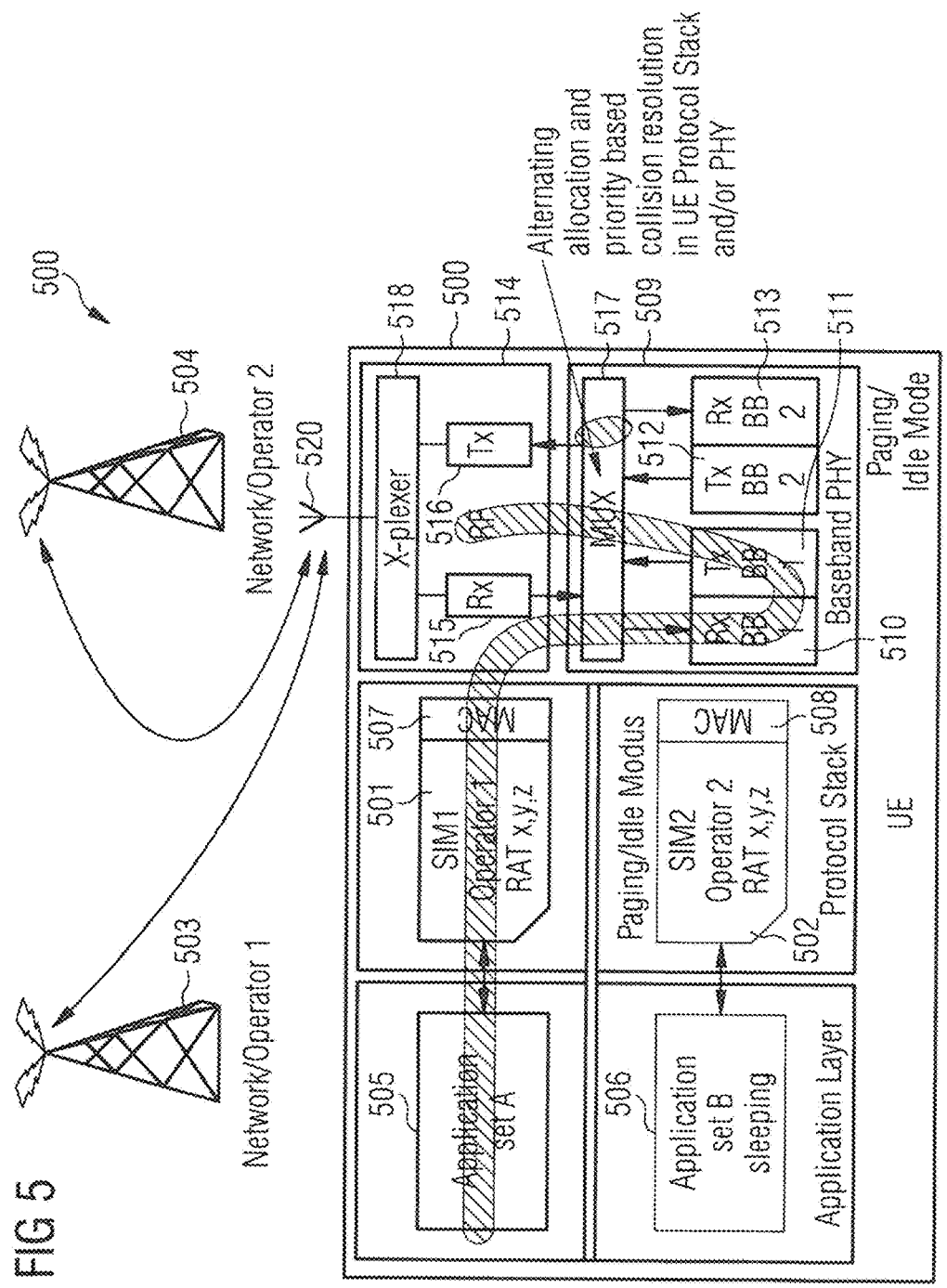
FIG. 5 shows a dual-SIM mobile terminal with a single (RF) transmit and receive chain.

FIG. 5 shows a dual-SIM mobile terminal 500 with a single (RF) transmit and receive chain.

Similarly to the mobile terminal 400, the mobile terminal 500 includes a first SIM 501 for usage of a first communication network of a first operator including a first base station 503, e.g. corresponding to one of the base stations 305 (e.g. a UMTS SIM) and a second SIM 502 for usage of a second communication network of a second operator including a second base station 504, e.g. corresponding to one of the base stations 302 (e.g. an LTE SIM).

A first set of applications 505 communicates via the first SIM 501, i.e. communicates via the first communication network under the subscription of the first SIM 501. A second set of applications 506 communicates via the second SIM 502, i.e. communicates via the second communication network under the subscription of the second SIM 502. The applications 505, 506 are located on the application layer, e.g. according to the ISO/OSI reference model. The SIMs 501, 502 can be seen to be part of the protocol stack, which also provides a respective MAC layer 507, 508.

The mobile terminal 500 includes a baseband circuit 509 which includes a receive (RX) baseband unit 510 and a transmit (TX) baseband unit 511 for the first SIM as well as a receiver baseband unit 512 and a transmit baseband unit 513 for the second SIM. This means that the mobile terminal can handle baseband RX and TX processing for both SIMs 501, 502 in parallel.

In this example, it is further assumed that the mobile terminal 500 includes an RF unit 514 which includes a single receive RF path 515 and a single transmit RF path 516 for both SIMs 501, 502. This means that the mobile terminal 500 is equipped with a single RF transmit chain and a single TX transmit chain for both SIMs 501, 502 and can therefore not handle RF RX and TX processing for both SIMs 501, 502 in parallel. The RF RX/TX paths 515, 516 are connected via a multiplexer 517 to the respective baseband units 510 to 513 and (e.g. via a Diplexer 518) to an antenna 520 for radio communication with the base stations 503, 504.

The control of multiple concurrent accesses to a commonly used radio channel is usually handled by the media access control (MAC) layer in communication systems (which belongs to Layer 2 in the OSI/ISO model). In a mobile terminal with a single SIM which supports multiple mobile radio access technologies (RAT) like 2G, 3G, LTE, etc., the RATs typically share a single receive and transmit chain due to cost and coexistence reasons. The corresponding MAC layers of the involved RATs are then designed to be multi-RAT aware and include mechanisms to schedule and coordinate concurrent access of the involved RATs. However, today's mobile terminals with multiple SIMs, such as mobile terminal 500, are standardized without introducing Multi-SIM aware functionality in the involved MAC layers 507, 508.

When both SIMs 501, 502 are only paging, a scheduling can usually be found that allows for simple alternating usage of the single receiver chain 515 and transmitter chain 516 and collision resolution, e.g. by simple priority based assignment of the available resources to the two SIMs 501, 502 by the protocol stack software and the physical layer firmware, e.g. represented by the multiplexer 517.

However, as soon as one SIM enters a call (the first SIM 501 in the illustration of FIG. 5), this SIM 501 usually occupies at least a large fraction or even 100% of the single receiver chain 515 and/or transmitter chain 516. Then, simple alternating usage of single receiver/transmitter resources and priority based collision resolution might still be possible when only one SIM enters a call as long as the other SIM stays in idle/paging since in idle/paging mode only receive resources are required and the allocation times are typically short. However, for DSDA, applications of both applications sets 505, 506 and both SIMs 501, 502 may be in a call (or more generally a dedicated connection) simultaneously and alternating usage and priority based collision resolution are no longer feasible.

In the following, the RX/TX resource allocation as required by LTE and 3G are described with reference to FIGS. 6 and 7.

Figure 6:
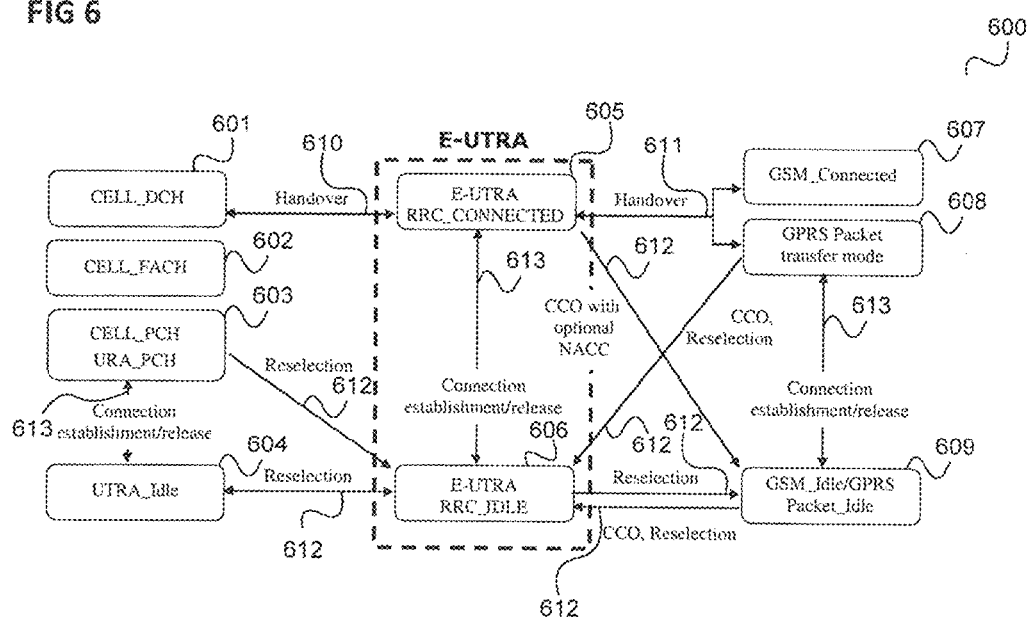
FIG. 6 shows a state diagram showing E-UTRA RRC states and inter-RAT mobility procedures related to UMTS, LTE and GSM.

FIG. 6 shows a state diagram 600 showing E-UTRA RRC states and inter-RAT mobility procedures related to UMTS, LTE and GSM.

The state diagram 600 includes the UMTS (UTRA, 3G) mobile terminal states CELL_DCH 601, CELL_FACH 602, CELL_PCH/URA_PCH 603, and UTRA_Idle 604, the LTE (E-UTRA) mobile terminal states RRC CONNECTED 605 and RRC IDLE 606 and the GSM (GERAN, 2G and 2.5G) mobile terminal states GSM_Connected 607, GPRS Packet Transfer Mode 608, and GSM_Idle/GPRS Packet_Idle 609. Contrary to UMTS, there are only two E-UTRA RRC states defined for the mobile terminal 105. FIG. 6 can be seen to illustrate the mobility support between E-UTRA, UTRA and GERAN.

According to a first state transition 610, a handover may be carried out between E-UTRA (i.e. a base station 103 operating according to LTE) and UTRAN (i.e. a base station 103 operating according to UTMS).

According to a second state transition 611, a handover may be carried out between E-UTRA (i.e. a base station 103 operating according to LTE) and GERAN (i.e. a base station 103 operating according to GSM).

Third state transitions 612 may occur between states of the UTRAN, the GERAN, and the E-UTRAN, e.g. in case of cell reselection without the handover of an active call. It should be noted that state transitions between states of the UTRAN and GERAN are omitted for simplicity but may also be possible.

Fourth state transitions 613 may occur between states of the same radio access technology, e.g. when a connection is released or a connection is established. The mobile terminal 105 is in RRC CONNECTED when an RRC connection has been established. If this is not the case, i.e. no RRC connection is established, the mobile terminal 105 is in RRC_IDLE state.

Figure 7:
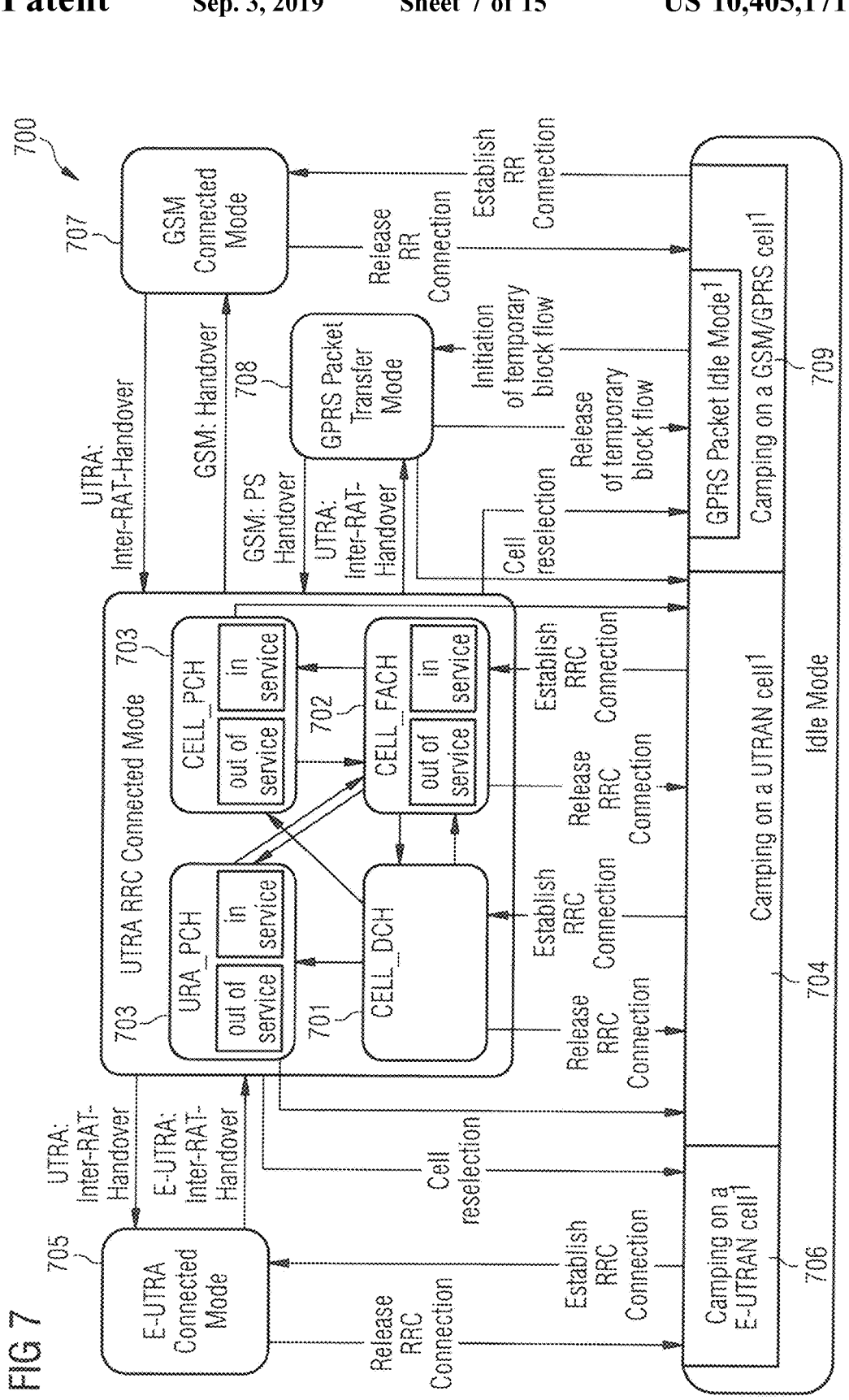
FIG. 7 shows another state diagram showing E-UTRA RRC states and inter-RAT mobility procedures related to UMTS, LTE and GSM.

FIG. 7 shows another state diagram 700 showing E-UTRA RRC states and inter-RAT mobility procedures related to UMTS, LTE and GSM.

The state diagram 700 can be seen as an alternative representation of the UMTS, LTE and GSM states and transitions between them.

Similar to the state diagram 600, the state diagram 700 includes the UMTS (UTRA, 3G) mobile terminal states CELL_DCH 701, CELL_FACH 702, CELL_PCH/URA_PCH 703, and UTRA_Idle 704, the LTE (E-UTRA) mobile terminal states RRC CONNECTED 705 and RRC IDLE 706 and the GSM (GERAN, 2G and 2.5G) mobile terminal states GSM_Connected 707, GPRS Packet Transfer Mode 708, and GSM_Idle/GPRS Packet_Idle 709 with transitions between them as explained with reference to FIG. 6.

In E-UTRA (LTE), starting a call means entering the RRC (Radio Resource Control) state RRC Connected 605, 705. In UTRA (3G), starting a call means entering the RRC states CELL_FACH 602, 702 or CELL_DCH 601, 701. State transitions within LTE or 3G from idle mode 604, 704, 606. 706 to connected mode requires RRC connection establishment which involves random access to the network in the uplink and hence corresponding uplink resources.

While LTE does not necessarily require continuous reception and transmission and corresponding resource allocation even in an ongoing call, the situation is different in 3G (UMTS) as explained in the following.

In 3G cell-FACH state, the mobile terminal (UE) is required to receive the FACH transport channel continuously, hence to occupy an RX receive chain continuously. Uplink accesses to the network are handled via Random Accesses in cell-FACH which leads to some specific pattern regarding the utilization of an TX uplink transmission chain.

In 3G enhanced cell-FACH (eFACH) state, the (UE) is required to occupy an RX receive chain continuously (with potential gaps for power saving) for HS-PDSCH reception. Uplink accesses to the network are still handled via Random Accesses in cell-FACH which leads to some specific pattern regarding the utilization of an TX uplink transmission chain.

In 3G enhanced uplink in cell-FACH (eRACH) state, the (UE) is required to occupy an RX receive chain continuously (with potential gaps for power saving) for HS-PDSCH and FDPCH reception and to occupy a TX chain continuously for uplink DPCCH transmission plus E-DCH transmission.

In 3G cell-DCH state, the UE is required to occupy both uplink and downlink TX and RX resources continuously for uplink DPCCH/DPDCH and E-DCH transmissions and downlink DPCH, F-DPCH reception and HS-SCCH/HS_PDSCH reception.

Accordingly, as soon as one SIM card enters a 3G call, exchanging data via a second communication connection (via the other SIM) in parallel is typically not possible with a single receiver chain or a single transmitter chain.

In the following, a communication terminal is described which may for example provide DSDA in case that a 3G connection is involved even if it includes a single receiver chain and a single transmitter chain.

Figure 8:
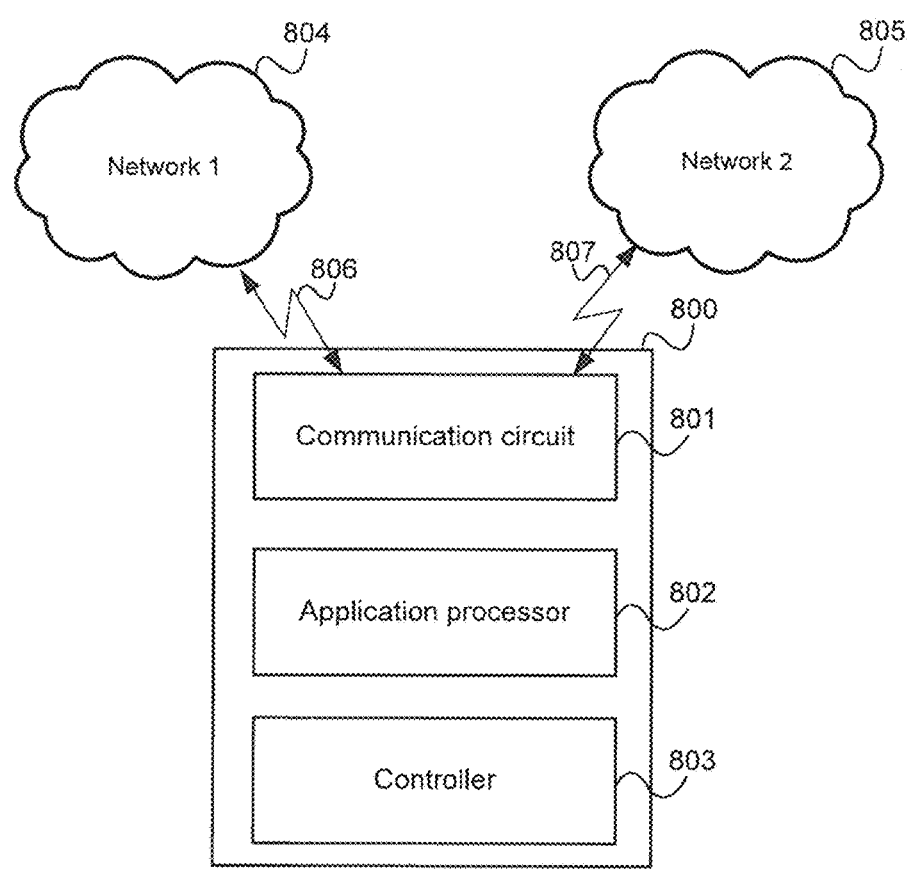
FIG. 8 shows a communication terminal.

FIG. 8 shows a communication terminal 800.

The communication terminal 800 includes a communication circuit 801 for communicating over different communication networks 804, 805 and an application processor 802 configured to execute a plurality of applications.

The communication terminal 800 further includes a controller 803 configured to receive, from each application of the plurality of applications, a respective request for an exchange of application layer data over a communication network 804, 805 associated with the respective application, to select, based on a predetermined criterion, a first application of the plurality of applications and to control the communication circuit 801 to perform an exchange according to the request received from the first application over a first network layer communication connection 806 to a communication network 804 associated with the first application; to initiate, for a second application of the plurality of applications, a buffering, during the first network layer communication connection 806, of application layer data requested to be exchanged according to the request received from the second application; to control the communication circuit to release the first network layer communication connection 806 based on a duration of the buffering and to control the communication circuit to establish a second network layer communication connection 807 to a communication network 805 associated with the second application which is different from the communication network 804 associated with the first application and perform an exchange according to the request received from the second application over the second network layer communication connection 807 after release of the first network layer communication connection 806.

In other words, for example, a communication terminal exchanges first application layer data to be exchanged with a first communication network (e.g. used by means of a first SIM) via a first communication connection (e.g. a data call) while the communication terminal lets second application layer data to be exchanged with a second communication network (e.g. used via a second SIM) be buffered. Then, the communication terminal releases the first communication connection and establishes a second communication connection (e.g. a data call) to exchange the buffered second application layer data.

The network layer communication connections are for example IP (Internet Protocol) connections.

The communication circuit may for example include two modems, wherein the first modem is configured to communication with the first communication network and the second modem is configured for communication with the second communication network. The two modems may for example share a single RF chain. For example, the first modem may include a baseband circuit according to a first RAT and the second modem may include a baseband circuit according to a second RAT.

Two communication networks being different may for example mean that the communication networks are configured according to different RATs or are operated by different operators or both. Two communication networks being different may also mean that the communication networks are independent communication networks, e.g. with an independent network infrastructure or for example each requiring its own subscription (to be a home network rather than a visited network for roaming).

The communication connections are network layer communication connections, i.e. layer 3 communication connections according to the OSI (Open Systems Interconnection Model) reference model. For example, having a network layer communication connection, e.g. by means of a SIM, means that the communication terminal is in a layer 3 connected mode (e.g. a E-UTRA or UTRA RRC connected mode), e.g. for that SIM.

The components of the communication terminal (e.g. the communication circuit and the controller) may for example be implemented by one or more circuits. A "circuit" may be understood as any kind of a logic implementing entity, which may be special purpose circuitry or a processor executing software stored in a memory, firmware, or any combination thereof (e.g. an operating system). Thus a "circuit" may be a hard-wired logic circuit or a programmable logic circuit such as a programmable processor, e.g. a microprocessor. A "circuit" may also be a processor executing software, e.g. any kind of computer program. Any other kind of implementation of the respective functions which will be described in more detail below may also be understood as a "circuit".

Figure 9:
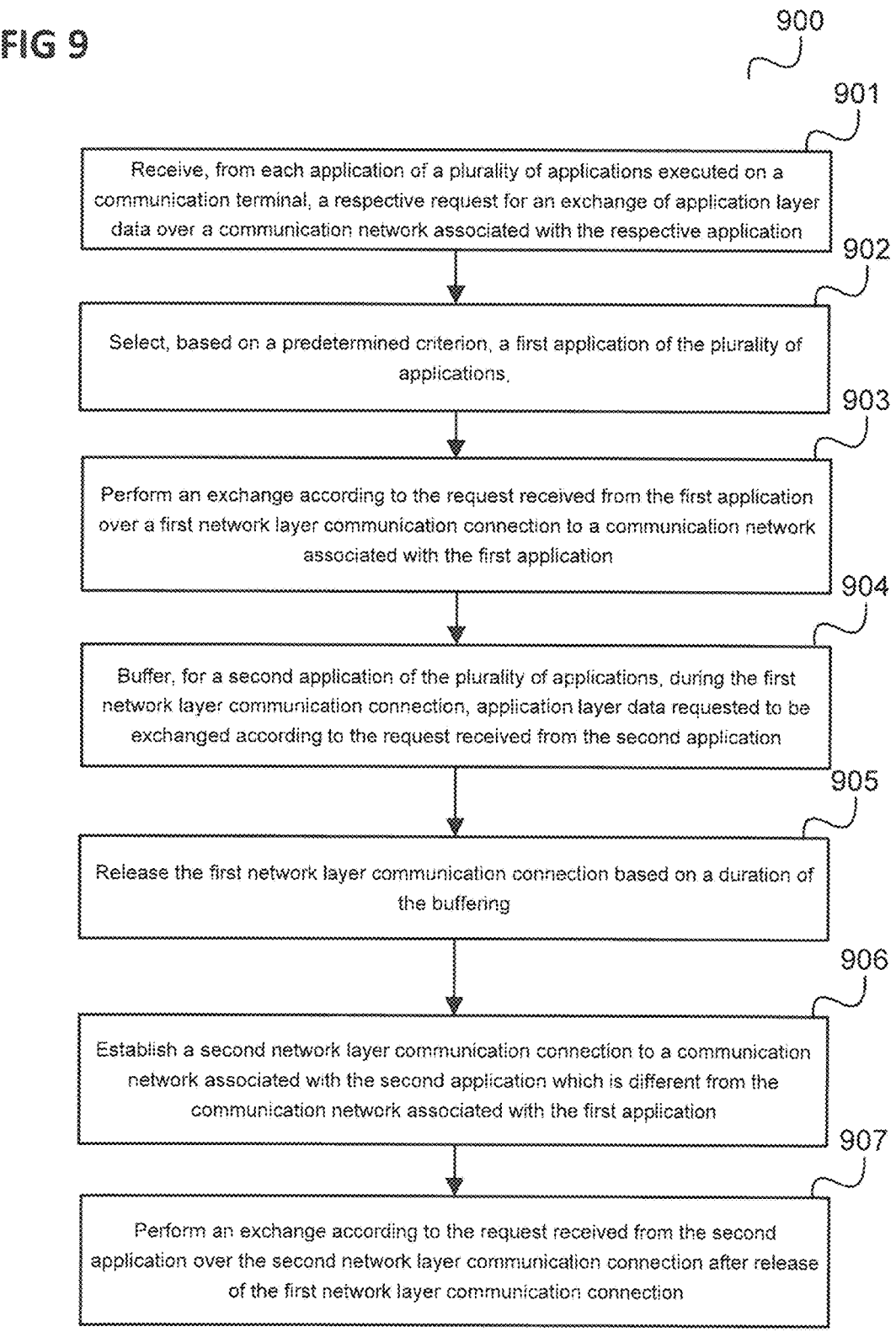
FIG. 9 shows a flow diagram illustrating a method for communicating data.

The communication terminal for example performs a method as illustrated in FIG. 9.

FIG. 9 shows a flow diagram 900 illustrating a method for communicating data, e.g. performed by a communication terminal.

In 901, a component of the communication terminal receives, from each application of a plurality of applications executed on the communication terminal, a respective request for an exchange of application layer data over a communication network associated with the respective application.

In 902, the communication terminal selects, based on a predetermined criterion, a first application of the plurality of applications.

In 903, the communication terminal performs an exchange according to the request received from the first application over a first network layer communication connection to a communication network associated with the first application.

In 904, the communication terminal (or another communication device) buffers, for a second application of the plurality of applications, during the first network layer communication connection, application layer data requested to be exchanged according to the request received from the second application.

In 905, the communication terminal releases the first network layer communication connection based on a duration of the buffering.

In 906, the communication terminal establishes a second network layer communication connection to a communication network associated with the second application which is different from the communication network associated with the first application.

In 907, the communication terminal performs an exchange according to the request from the second application over the second network layer communication connection after release of the first network layer communication connection.

The following examples pertain to further embodiments

Example 1 is a communication terminal as illustrated in FIG. 8.

In Example 2, the subject-matter of Example 1 may optionally include the controller being configured to control the communication circuit to release the first network layer communication connection based on a level of a buffer buffering the application layer data requested to be exchanged according to the request received from the second application.

In Example 3, the subject-matter of any one of Examples 1-2 may optionally include the controller being configured to control the communication circuit to release the first network layer communication connection based on whether the duration of the buffering of the application layer data has reached a predetermined threshold.

In Example 4, the subject-matter of Example 3 may optionally include the controller being configured to set the predetermined threshold based on an allowable latency of the application layer data requested to be exchanged according to the request received from the second application.

In Example 5, the subject-matter of any one of Examples 1-4 may optionally include the application layer data requested to be exchanged according to the request received from the first application being data to be transmitted by the communication terminal and the exchange of the application layer data requested to be exchanged according to the request received from the first application being sending the application layer data requested to be exchanged according to the request received from the first application.

In Example 6, the subject-matter of any one of Examples 1-5 may optionally include the application layer data requested to be exchanged according to the request received from the second application being data to be transmitted by the communication terminal and the exchange of the application layer data requested to be exchanged according to the request received from the second application being sending the application layer data requested to be exchanged according to the request received from the second application.

In Example 7, the subject-matter of Example 6 may optionally include the communication terminal comprising a buffer and the controller being configured to initiate the buffering of the application layer data requested to be exchanged according to the request received from the second application in the buffer.

In Example 8, the subject-matter of Example 7 may optionally include the buffer being an application layer buffer.

In Example 9, the subject-matter of any one of Examples 1-4 may optionally include the application layer data requested to be exchanged according to the request received from the first application being data to be received by the communication terminal and the exchange of the application layer data requested to be exchanged according to the request received from the first application being receiving the application layer data requested to be exchanged according to the request received from the first application.

In Example 10, the subject-matter of any one of Examples 1-4 may optionally include the application layer data requested to be exchanged according to the request received from the second application being data to be received by the communication terminal and the exchange of the application layer data requested to be exchanged according to the request received from the second application being receiving the application layer data requested to be exchanged according to the request received from the second application from a communication device.

In Example 11, the subject-matter of Example 10 may optionally include the communication device comprising a buffer and the controller being configured to initiate the buffering of the application layer data requested to be exchanged according to the request received from the second application in the buffer.

In Example 12, the subject-matter of Example 11 may optionally include the buffer being an application layer buffer.

In Example 13, the subject-matter of any one of Examples 1-12 may optionally include the controller being configured to initiate, for a third application of the plurality of applications, a buffering, during the second network layer communication connection, of third application layer data requested to be exchanged according to the request received from the third application.

In Example 14, the subject-matter of any one of Examples 1-13 may optionally include the controller being configured to initiate a buffering, during the second network layer communication connection, of further application layer data requested to be exchanged according to the request received from the first application.

In Example 15, the subject-matter of any one of Examples 1-14 may optionally include the communication circuit comprising at least one of a radio frequency transceiver chain and a baseband processor supporting communication for a plurality of subscriber identity modules being installed in the communication terminal.

In Example 16, the subject-matter of any one of Examples 1-15 may optionally include a first subscriber identity module for providing communication connections to the first communication network and a second subscriber identity module for providing communication connections to the second communication network wherein the communication circuit being configured to communicate over communication connections provided via the first subscriber identity module and to communicate over communication connections provided via the second subscriber identity module.

In Example 17, the subject-matter of any one of Examples 1-16 may optionally include the communication circuit being configured to provide a network layer communication connection to either the first communication network or the second communication network at a time.

In Example 18, the subject-matter of Example 17 may optionally include the communication circuit being configured to notify the controller when the first network layer communication connection and a corresponding usage of a radio frequency resource of the communication terminal has been released and a network layer communication connection to the second communication network has become available.

In Example 19, the subject-matter of any one of Examples 1-18 may optionally include the first network layer communication being based on a physical layer radio connection to the first communication network and the second network layer communication connection being based on a physical layer radio connection to the second communication network.

In Example 20, the subject-matter of Example 19 may optionally include the communication circuit being configured to establish the second network layer communication after a predetermined guard interval has expired since the release of the first network layer communication connection.

In Example 21, the subject-matter of any one of Examples 1-20 may optionally include at least one of the first network layer communication connection and the second network layer communication connection being a dedicated communication connection.

In Example 22, the subject-matter of any one of Examples 1-21 may optionally include at least one of the first communication connection and the second communication connection being a UMTS communication network, a 2G communication network or an LTE communication network.

In Example 23, the subject-matter of any one of Examples 1-22 may optionally include the controller being configured to control the communication circuit to switch into UTRA RRC Connected Mode for establishing the first network layer communication connection.

In Example 24, the subject-matter of any one of Examples 1-23 may optionally include the controller being configured to establish the first network layer communication connection.

In Example 25, the subject-matter of any one of Examples 1-24 may optionally include the controller being configured to select the first application based on at least one of a time of the request by the first application and a latency requirement of the data requested to be exchanged according to the request received from the first application.

In Example 26, the subject-matter of any one of Examples 1-25 may optionally include the controller being configured to select the first application based on whether the first communication connection has already been established.

Example 27 is a method for communicating data as illustrated in FIG. 9.

In Example 28, the subject-matter of any one of Examples 27-28 may optionally include releasing the first network layer communication connection based on a level of a buffer buffering the application layer data requested to be exchanged according to the request received from the second application.

In Example 29, the subject-matter of any one of Examples 27-28 may optionally include releasing the first network layer communication connection based on whether the duration of the buffering of the application layer data has reached a predetermined threshold.

In Example 30, the subject-matter of Example 29 may optionally include setting the predetermined threshold based on an allowable latency of the application layer data requested to be exchanged according to the request received from the second application.

In Example 31, the subject-matter of any one of Examples 27-30 may optionally include the application layer data requested to be exchanged according to the request received from the first application being data to be transmitted by the communication terminal and the exchange of the application layer data requested to be exchanged according to the request received from the first application being sending the application layer data requested to be exchanged according to the request received from the first application.

In Example 32, the subject-matter of any one of Examples 27-30 may optionally include the application layer data requested to be exchanged according to the request received from the second application being data to be transmitted by the communication terminal and the exchange of the application layer data requested to be exchanged according to the request received from the second application being sending the application layer data requested to be exchanged according to the request received from the second application.

In Example 33, the subject-matter of Example 32 may optionally include buffering the application layer data requested to be exchanged according to the request received from the second application in a buffer of the communication terminal.

In Example 34, the subject-matter of Example 33 may optionally include the buffer being an application layer buffer.

In Example 35, the subject-matter of any one of Examples 27-30 may optionally include the application layer data requested to be exchanged according to the request received from the first application being data to be received by the communication terminal and the exchange of the application layer data requested to be exchanged according to the request received from the first application being receiving the application layer data requested to be exchanged according to the request received from the first application.

In Example 36, the subject-matter of any one of Examples 27-30 may optionally include the application layer data requested to be exchanged according to the request received from the second application being data to be received by the communication terminal and the exchange of the application layer data requested to be exchanged according to the request received from the second application being receiving the application layer data requested to be exchanged according to the request received from the second application from a communication device.

In Example 37, the subject-matter of Example 36 may optionally include buffering the application layer data requested to be exchanged according to the request received from the second application in a buffer of the communication device.

In Example 38, the subject-matter of Example 37 may optionally include the buffer being an application layer buffer.

In Example 39, the subject-matter of any one of Examples 27-38 may optionally include, for a third application of the plurality of applications, buffering, during the second network layer communication connection, third application layer data requested to be exchanged according to the request received from the third application.

In Example 40, the subject-matter of any one of Examples 27-39 may optionally include buffering, during the second network layer communication connection, further application layer data requested to be exchanged according to the request received from the first application.

In Example 41, the subject-matter of any one of Examples 27-40 may optionally include the communication terminal comprises at least one of a radio frequency transceiver chain and a baseband processor supporting communication for a plurality of subscriber identity modules being installed in the communication terminal.

In Example 42, the subject-matter of any one of Examples 27-41 may optionally include communicating over communication connections provided via a first subscriber identity module for providing communication connections to the first communication network and communicating over communication connections provided via a second subscriber identity module for providing communication connections to the second communication network.

In Example 43, the subject-matter of any one of Examples 27-42 may optionally include providing a network layer communication connection for the communication terminal to either the first communication network or the second communication network at a time.

In Example 44, the subject-matter of Example 43 may optionally include notifying a component of the communication terminal establishing the second network layer communication connection about when the first network layer communication connection and a corresponding usage of a radio frequency resource of the communication terminal has been released and a network layer communication connection to the second communication network has become available.

In Example 45, the subject-matter of any one of Examples 27-44 may optionally include the first network layer communication connection being based on a physical layer radio connection to the first communication network and the second network layer communication connection being based on a physical layer radio connection to the second communication network.

In Example 46, the subject-matter of Example 45 may optionally include establishing the second network layer communication after a predetermined guard interval has expired since the release of the first network layer communication connection.

In Example 47, the subject-matter of any one of Examples 27-46 may optionally include at least one of the first network layer communication connection and the second network layer communication connection being a dedicated communication connection.

In Example 48, the subject-matter of any one of Examples 27-47 may optionally include at least one of the first communication connection and the second communication connection being a UMTS communication network, a 2G communication network or an LTE communication network.

In Example 49, the subject-matter of any one of Examples 27-48 may optionally include switching into UTRA RRC Connected Mode for establishing the first network layer communication connection.

In Example 50, the subject-matter of any one of Examples 27-49 may optionally include establishing the first network layer communication connection.

In Example 51, the subject-matter of any one of Examples 27-50 may optionally include selecting the first application based on at least one of a time of the request by the first application and a latency requirement of the data requested to be exchanged according to the request received from the first application.

In Example 52, the subject-matter of any one of Examples 27-51 may optionally include selecting the first application based on whether the first communication connection has already been established.

Example 53 is a computer readable medium having recorded instructions thereon which, when executed by a processor, make the processor perform a method for communicating data according to any one of Examples 27 to 52.

It should be noted that one or more of the features of any of the examples above may be combined with any one of the other examples.

In the following, examples are described in more detail.

Figure 10:
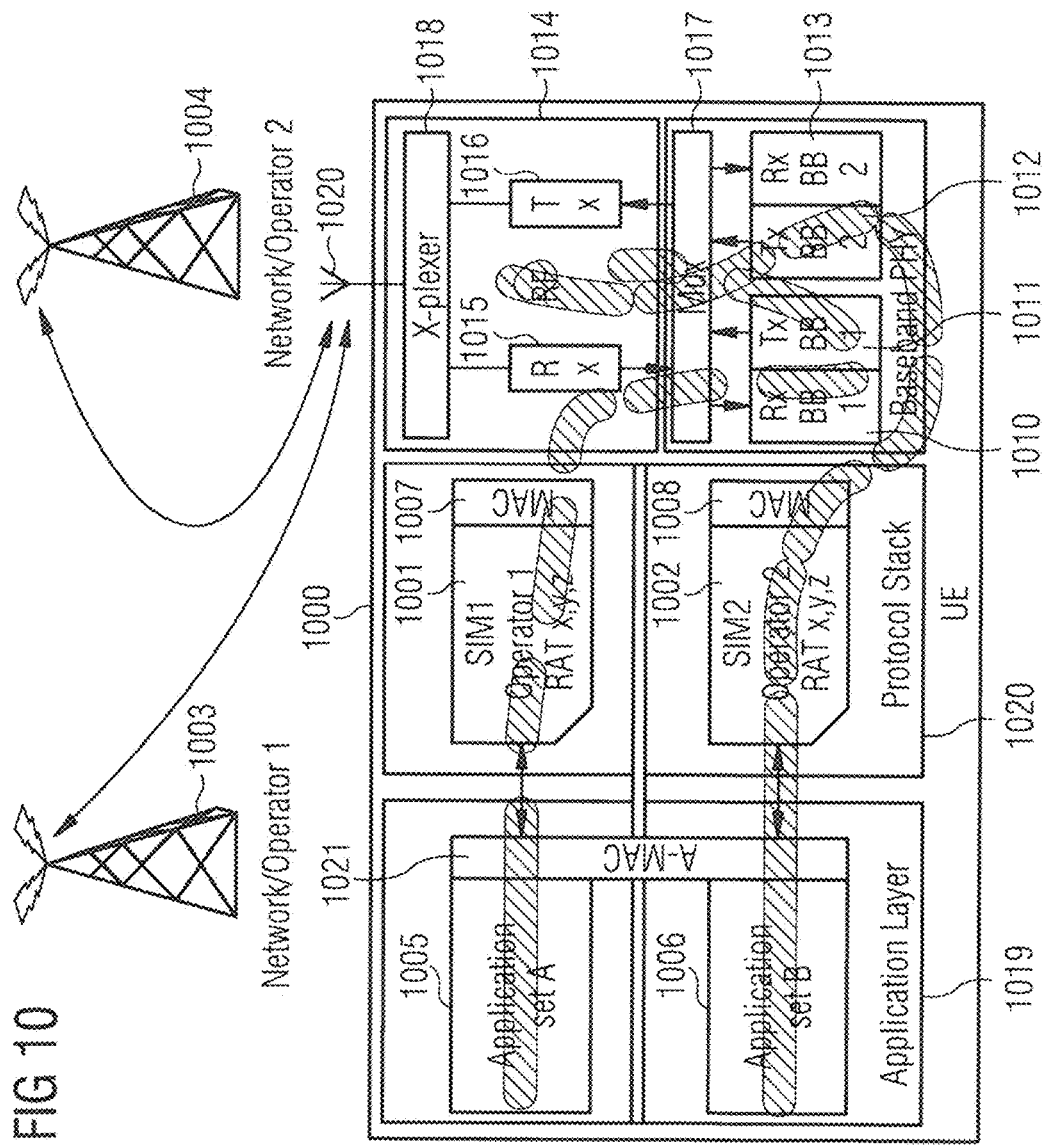
FIG. 10 shows a dual-SIM mobile terminal with a single (RF) transmit and receive chain managed by a Multi-SIM aware media access control mechanism.

In the example described in the following, a Multi-SIM aware media access control mechanism (A-MAC) in the application layer is provided as illustrated in FIG. 10.

FIG. 10 shows a dual-SIM mobile terminal 1000 with a single (RF) transmit and receive chain managed by an Multi-SIM aware media access control mechanism.

Similarly to the mobile terminal 500, the mobile terminal 1000 includes a first SIM 1001 for usage of a first communication network of a first operator including a first base station 1003, e.g. corresponding to one of the base stations 305 (e.g. a UMTS SIM) and a second SIM 1002 for usage of a second communication network of a second operator including a second base station 1004, e.g. corresponding to one of the base stations 302 (e.g. an LTE SIM).

A first set of applications 1005 communicates via the first SIM 1001, i.e. communicates via the first communication network under the subscription of the first SIM 1001. A second set of applications 1006 communicates via the second SIM 1002, i.e. communicates via the second communication network under the subscription of the second SIM 1002. The applications 1005, 1006 are located on the application layer 1019, e.g. according to the ISO/OSI reference model. The SIMs 1001, 1002 can be seen to be part of the protocol stack 1020, which also provides a respective MAC layer 1007, 1008.

Further, in the application layer 1019, an A-MAC 1021 is provided (e.g. corresponding to the controller 803), e.g. implemented by a processor running the applications of application sets 1005, 1006.

The mobile terminal 1000 includes a baseband circuit 1009 which includes a receive (RX) baseband unit 1010 and a transmit (TX) baseband unit 1011 for the first SIM as well as a receiver baseband unit 1012 and a transmit baseband unit 1013 for the second SIM. This means that the mobile terminal can handle baseband RX and TX processing for both SIMs 1001, 1002 in parallel.

The mobile terminal 1000 includes an RF unit 1014 which includes a single receive RF path 1015 and a single transmit RF path 1016 for both SIMs 1001, 1002. This means that the mobile terminal 1000 is equipped with a single RF transmit chain and a single TX transmit chain for both SIMs 1001, 1002 and can therefore not handle RF RX and TX processing for both SIMs 1001, 1002 in parallel. The RF RX/TX paths 1015, 1016 are connected via a multiplexer 1017 to the respective baseband units 1010 to 1013 and (e.g. via a Diplexer 1018) to an antenna 1020 for radio communication with the base stations 1003, 1004.

Unlike a MAC layer, which can be seen to manage a radio channel as shared resources, the A-MAC 1021 manages the single transmitter/receiver resource (i.e. the single receive chain 1015 and the single transmit chain 1016 shared between the SIMs 1001, 1002) as shared resource.

The A-MAC 1020 performs application layer scheduling of the data transfers and activities of the SIMs 1001, 1002 with the goal of collision avoidance with respect to the shared transmitter/receiver resources (e.g. to the largest possible extent). Since even the application layer 1019 does typically not have complete control over the data transfers and activities of the SIMs 1001, 1002 it may not be possible to completely avoid collisions. In case of such a collision, the priority based collision resolution functionality in the UE protocol stack and/or physical layer mentioned above may be activated.

In 3GPP, radio access bearers are defined for different service types. For example, the mobile terminal 100 distinguishes the five service classes as indicated in the first column of table 1 and manages the sharing of the single receiver/transmitter resource as indicated in the fifth column of table 1.

TABLE 1

| Service Class | Latency Requirements | Data rate | Nature of Access | RX/TX resource sharing |
|---|---|---|---|---|
| I. Conversational e.g. VoIP/VoLTE/Video Call | Very high | Low | One long call with fixed periodic activity pattern | Prioritize and use activity gaps for the other SIM |
| II: Interactive e.g. Web Browsing, instant messaging, chat, social media sharing | High | Medium | Short bursts of activity | Collect/aggregate and transmit in a dedicated call setup, release call via SCRI afterwards |
| III. Short Background e.g. application "keep alive" messages, Mail access | Low | Low to medium | Short bursts of activity | Collect/aggregate and transmit in a dedicated call setup, release call via SCRI afterwards |
| IV. Streaming e.g. Youtube Video | Medium | Medium to high | One long call | Application Layer split of the file into small chunks, transmissions of chunks in dedicated call setups, release calls via SCRI afterwards |
| V. Long Background e.g. File Download/Upload | Low | Medium to high | One long call | Application Layer split of the file into small chunks, transmissions of chunks in dedicated call setups, release calls via SCRI afterwards |
| MT Call Setups | N/A | N/A | N/A | Avoid to the largest possible extent by structuring application SW accordingly (use MO call setups exclusively) |

The A-MAC 1020 for example performs collection/aggregation of latency uncritical packet transmissions for each SIM 1001, 1002 with the goal to perform bursty transmission/reception for each SIM 1001, 1002 in an alternating manner. The A-MAC 1020 for example tries to achieve a pattern of Data Call Setups and Data Call Releases from the two SIM cards 1001, 1002 such that the actual calls of the two SIM cards 1001, 1002 are mutually exclusive in time, i.e. that they appear sequentially on the physical layer. In the examples of FIG. 1, Service Class I is an exception, since the data traffic resulting here cannot be delayed, and the resulting long call cannot be interrupted.

In this context, mobile originated (MO) need to be distinguished from mobile terminated (MT) call setups: While the UE application layer 1020 is in charge of initiating MO call setups, MT call setups are initiated from the network side (and the UE is paged) hence the time of their occurrence cannot be controlled by the UE side.

Hence, MT call setups for a SIM 1001, 1002 are further exceptions where the A-MAC 1020 cannot delay (i.e. buffer) the resulting data traffic. The A-MAC 1020 can schedule less latency critical services from the other SIM 1001, 1002 (i.e. Service Class 2 and higher) around the fixed scheduling grid occupied by service class I communications and MT calls.

Generally, the applications 1005, 1006 may rely on MO call setups for initiating keep alive messages, mail access, instant messaging etc. to the largest possible extent, such that MT call setups are ideally restricted to real phone calls (i.e. voice communication). The mobile terminal 1000 can, however, for both MO and MT calls, autonomously initiate an RRC connection release by the network (and hence a call release) by sending a Signaling Connection Release Indicator (SCRI) message to the network, e.g. in accordance with the Fast Dormancy mechanism of 3GPP REL-8. It should be noted that the inactivity timer T323 may be set to 0 seconds in the network in order to work efficiently when the network supports Fast Dormancy.

Figure 11:
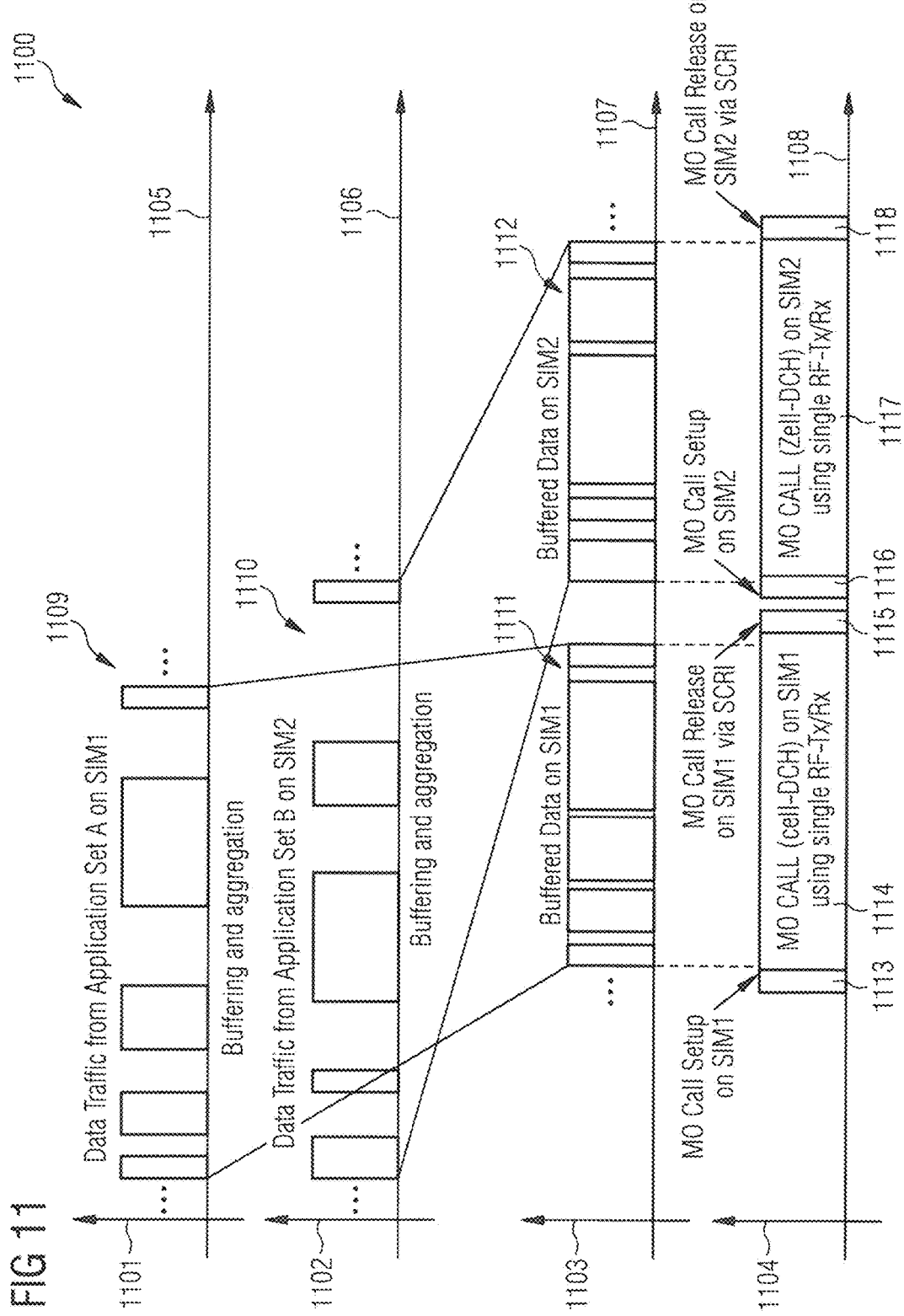
FIG. 11 illustrates the buffering of data and alternating communication of buffered data for two SIMs over a single RX/TX chain.

FIG. 11 illustrates the buffering of data and alternating communication of buffered data for two SIMs over a single RX/TX chain.

A first diagram 1001 shows data traffic 1109 as generated by the first application set 1005 (for communication over a communication connection provided by the first SIM 1001).

A second diagram 1002 shows data traffic 1110 as generated by the second application set 1006 (for communication over a communication connection provided by the second SIM 1002).

A third diagram 1003 shows the buffered data 1111 of the first application set 1005 as they are given to the physical layer for exchange with a communication device (in the mobile terminal 1000 in case of upload or in the communication device in case of download).

A fourth diagram 1004 shows the buffered data 1112 of the second application set 1006 as they are given to the physical layer for exchange with a further communication device (in the mobile terminal 1000 in case of upload or in the further communication device in case of download).

As shown in the fifth diagram 1005, the mobile terminal 1000 performs a first MO Call Setup 1113 of the first SIM with a following first MO Call 1114 for exchange of the buffered data of the first application set 1005 and (when the buffered data of the first application set 1005 have been exchanged) a first MO Call release 1115 of the first MO Call 1114 and, subsequently, a second MO Call 1116 Setup of the second SIM with a following second MO Call 1117 for exchange of the buffered data of the second application set 1006 and (when the buffered data of the second application set 1006 have been exchanged) a second MO Call release 1118 of the second MO Call 1117.

Time flows from left to right in the diagrams 1001, 1002, 1003, 1004 along time axes 1005, 1006, 1007, 1008 which correspond to each other.

With regard to Service Class I, due to the very high latency requirements of this class, and the fixed periodic activity pattern, the A-MAC 1020 for example gives highest priority to an application using a communication service in this service class. However, such a communication service requests physical layer (PHY) resources only periodically (using a fixed known scheduling grid).

The A-MAC 1020 may immediately use the approach described with reference to FIG. 11 for Service Classes II and III, i.e. collect or aggregate (or buffer) data for a SIM while there is a data call for the other SIM, release the call for the other SIM and setup a data call for the SIM to transmit the collected data.

For Service Classes IV and V, the A-MAC 1020 may apply this approach as follows.

For both Service Classes IV and V, the mobile terminal 1000 maintains the PDP context in the application layer software. The application layer 1019 (on the UE side for uploads, or on the serving side for downloads or streaming services) can split large files into smaller chunks and transmit (or receive in case of download) these chunks sequentially, resulting in short bursts of activity rather than one long download or upload. This file splitting and re-assembly can be done without the end user (i.e. the user of the mobile terminal 1000) noticing it. The UE 1000 may for example convey the requirement for file splitting to the other communication party (e.g. another communication device such as a server) before initiating the upload, download or streaming application. Since file uploads and downloads and streaming services are initiated by the UE application layer SW, the UE 1000 is in charge of controlling the applications in these two service classes.

Depending on the requirements of the RATs used by the SIMs 1001, 1002 there can still be a simultaneous call activation when both involved SIMs and their RATs can handle non-exclusive receive and/or transmit chains. For RATs relying on exclusive receive and/or transmit, the A-MAC 1020 prevents both SIMs to enter an active call that cannot be arbitrated later on by the physical layer.

The A-MAC 1020 can use a round robin scheduling of the involved SIMs 1001, 1002 to sequentially activate the SIMs for a particular time. The duty cycle of the activation may be fixed or may depend on the RATs capabilities or required data rates of the involved applications.

In the following, the application layer scheduling of multiple SIMs for the usage of a single RX/TX chain, e.g. as performed by A-MAC 1020 for SIMs 1001, 1002, in other words, the application layer of multi SIM media access is described in the following in more detail for a communication system as illustrated in FIG. 1.

Figure 12:
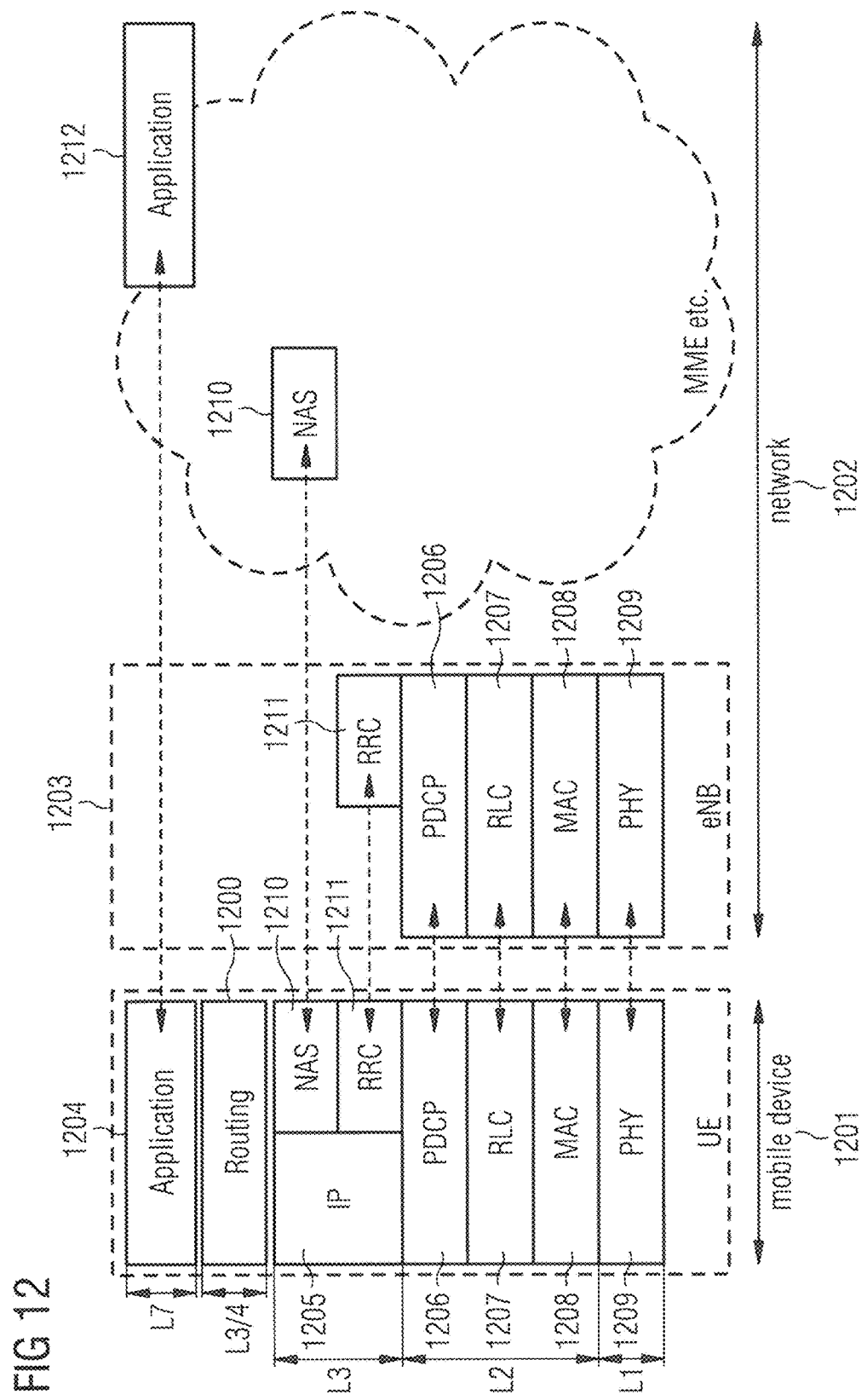
FIG. 12 illustrates the control plane of the Evolved Packet System (EPS).

FIG. 12 illustrates the control plane of the Evolved Packet System (EPS).

Packed switched (PS) connections are based on the EPS. In FIG. 12, the various layers (i.e. the components of the various layers) involved in a PS connection (e.g. a call) in the UE 1201 (e.g. corresponding to mobile terminal 105) and the network 1202 including a base station 1203 (e.g. corresponding to one of the eNBs 103) and further components such as an MME etc. are shown.

It is assumed that the mobile device (UE) 1201 has a connection to the network (NW) 1202. On the network side communication units and layers are distributed among multiple devices like the base station 1203 and the MME etc. and the UE 1201 is only in direct connection to the base station 1203.

An application 1204, 1212 of layer 7 can perform a PS connection either by originating the connection from the mobile side (mobile originated, MO) or from the network side (MT, mobile terminated). Depending on the used transport protocol (e.g. TCP, UDP, etc.) the PS data is routed on layer 3 or 4 to the IP protocol on layer 3. Routing takes into account by what 'route' the application 1204 can reach the corresponding application 1212 on the network side.

If multiple IP connections exist routing includes the selection of the correct IP (Internet Protocol) unit 1205. Different IP units may use different and exclusive lower layers consisting of Packet Data Convergence Protocol (PDCP) 1206, Radio Link Control (RLC) 1207, Medium Access Control (MAC) 1208 and the physical layer (PHY) 1209. The PHY 1209 is using radio frequency (RF) connection with corresponding RX and TX signal processing paths (e.g. corresponding to RX chain 515 and TX chain 516). The various layers typically contain data buffers to improve data throughput experience even when involved lower layers connection is stuttering e.g. due to bad reception conditions in the PHY or lost or disordered IP Protocol Data Units (PDUs).

Besides the IP unit 1205 the Non-Access Stratum (NAS) 1210 and the Radio Resource Control (RRC) 1211 are shown in FIG. 12. It is task of the NAS 1210 at the UE side and the NW side to handle the Packed Data Protocol (PDP) context activation and deactivation when upper layers have data available for the IP connection. The NAS 1210 uses the services of the RRC 1211 to control lower layer connections by triggering the RRC 1211 for RRC state transitions e.g. CELL_FACH to CELL_DCH. The RRC 1211 is also a distributed functionality between the UE side and the NW side. As an example the UE side RRC might only provide measurements like buffer occupancy to the NW and the NW side RRC configures the UE's RRC connection states based on the measurements.

On the UE side the RRC 1211 configures lower layers based on its RRC state which finally initiates RX and TX activity in the PHY 1209. For power consumption optimization modern wireless systems typically use NAS/RRC functionality to adapt the connection state to the availability of PS data packets and thus try to power optimize the lower layers connection states.

As an example, a 3G system is considered (without loss of generality). While PS data is available the RRC states are changed between CELL_FACH for very low data rates and CELL_DCH if sufficient data is available on the UE side or the NW side. As mentioned above the state changes are not autonomously done by the UE 1201 but triggered by UE's measurements signaled to the NW 1202. Since CELL_FACH has seamless RX and some TX activity further power savings for always on IP connectivity is preferred. The UE's NAS 1210 can request lower power RRC states like IDLE, CELL_PCH or URA_PCH by sending Signaling Connection Release Indication (SCRI) to the NW 1202 if no PS data is to be transmitted from UE side any more. Mechanisms like fast dormancy may be used to optimize these RRC state transitions further more while having an active PDP context.

Today's multi-SIM enabled UEs are typically using operating systems (OS) based on Linux (Android, iOS) or mobile windows etc. The applications as well as parts of the lower layers as illustrated in FIG. 12 are typically part of the UE's OS as illustrated in FIG. 13.

Figure 13:
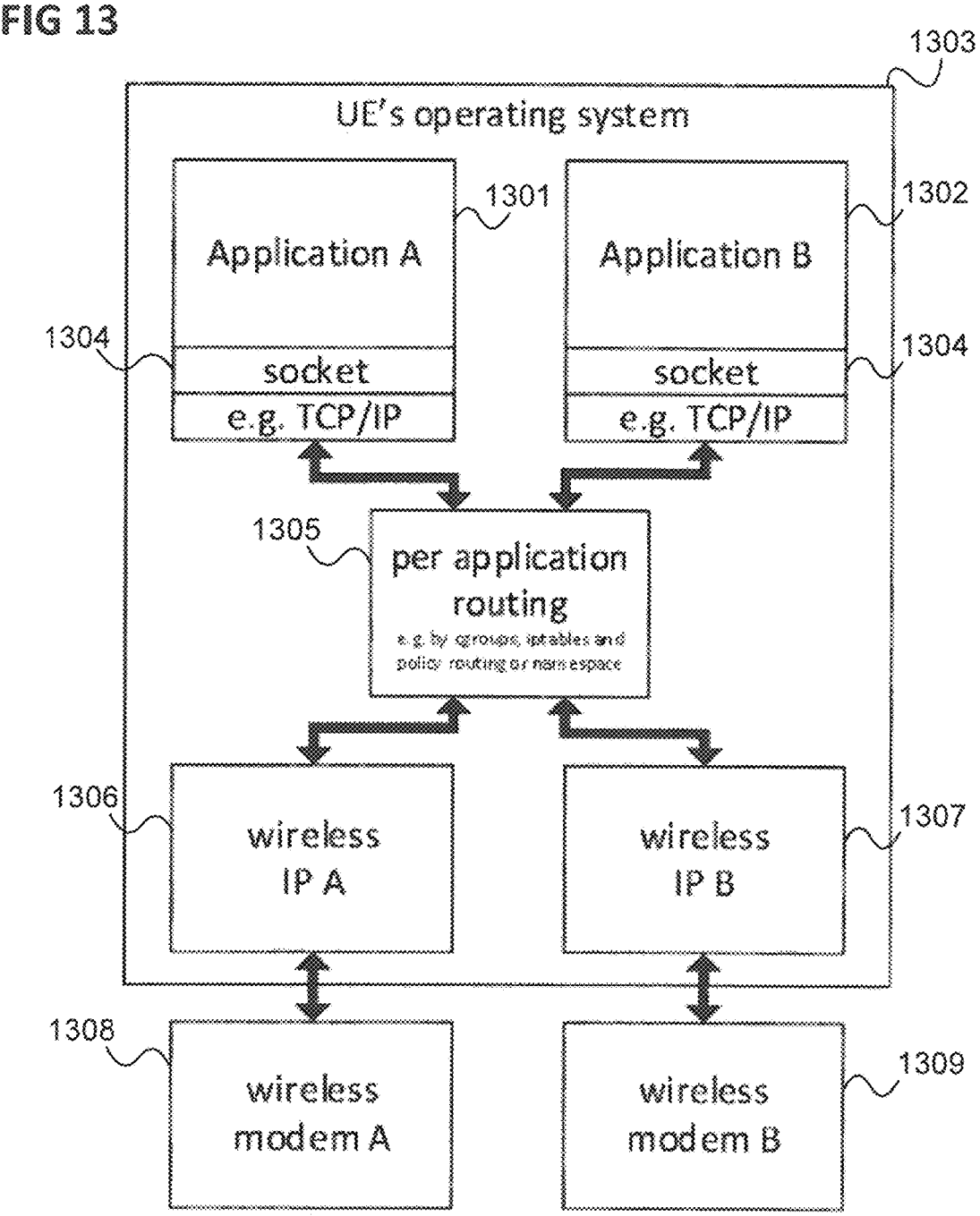
FIG. 13 illustrates the communication of applications running on a UE with wireless modems of the UE.

FIG. 13 illustrates the communication flow of applications running on a UE with wireless modems of the UE.

A first application 1301 and a second application 1302 are running on the UE's operating system 1303. They communicate, via a respective socket 1304 and per application routing 1305, with a first wireless IP unit 1306 and a second wireless IP unit 1307, respectively.

Via the first wireless IP unit 1306 the first application 1301 may access a first wireless modem 1308 (e.g. associated with a first SIM, e.g. corresponding to (RX) baseband unit 510 and transmit (TX) baseband unit 511) and via the second wireless IP unit 1307 the second application 1302 may access a second wireless modem 1309 (e.g. associated with a second SIM, e.g. corresponding to receiver baseband unit 512 and transmit baseband unit 513).

An application specific usage of the offered IP connections of the different SIMs is performed by the (per application) IP routing 1305. Such IP routing 1305 may be implemented by modern Linux functionalities cgroups, iptables and policy routing or namespace. As a result any traffic related to the first application uses the IP connection of the first SIM and any traffic related to the second application uses the IP connection of the second SIM.

If both modems 1308, 1309 have independent RF paths implemented both applications 1301, 1302 can exchange information with the network at the same time. However, as explained above, RF resources may need to be shared, e.g. because of bill of material (BOM) and it may be desired that collision resolution mechanisms at the PHY layer which typically degrade overall system performance are avoided.

Accordingly, as described above with reference to FIG. 10, an A-MAC may be provided to avoid or lower the likelihood of above mentioned simultaneous activation of the wireless modems 1308, 1309.

Figure 14:
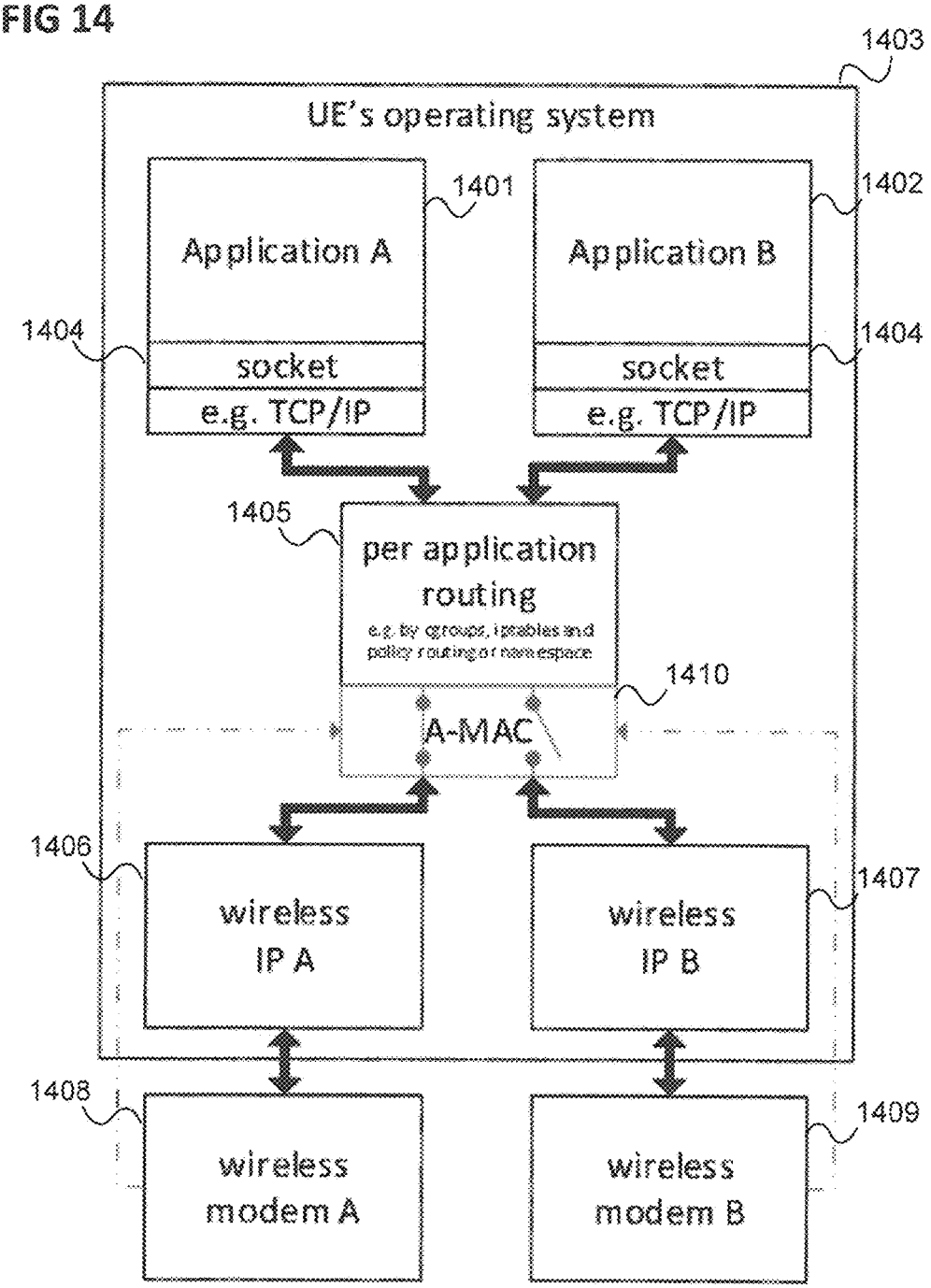
FIG. 14 illustrates the communication of applications running on a UE with wireless modems of the UE when an A-MAC is included.

FIG. 14 illustrates the communication flow of applications running on a UE with wireless modems of the UE when an A-MAC is included.

Similarly to FIG. 13, a first application 1401 and a second application 1402 are running on the UE's operating system 1403. They communicate, via a respective socket 1404 and per application routing 1405 and, in contrast to FIG. 13, via an A-MAC 1410 with a first wireless IP unit 1406 and a second wireless IP unit 1407, respectively.

Via the first wireless IP unit 1406 the first application 1401 may access a first wireless modem 1408 (e.g. associated with a first SIM, e.g. corresponding to (RX) baseband unit 510 and transmit (TX) baseband unit 511) and via the second wireless IP unit 1407 the second application 1402 may access a second wireless modem 1409 (e.g. associated with a second SIM, e.g. corresponding to receiver baseband unit 512 and transmit baseband unit 513).

Since only for MO connections the time of the modem activation is in the hand of the UE 1201 one can never avoid collisions completely by the A-MAC 1410. Nevertheless, once the connection is established the usage of the RF resource does not depend on the MO or MT condition but just on the PDU availability given to the IP units 1406, 1407.

The routing 1405 is extended by the A-MAC functionality that tries to exclusively schedule IP data to the wireless IP connections. While the first application 1401 has traffic routed to a first wireless IP connection via the first modem 1408 a second wireless IP connection via the second modem 1409 is stalled (or delayed). To the application 1402 a stalled connection looks as if no IP throughput is available and to the RRC 1211 and lower layers it looks like the application has no more data to be transmitted.

As mentioned in context of FIG. 12, there may be buffers already existing e.g. in the router unit, second IP unit 1407 and the second application 1402 itself that buffers PDUs of the second communication connection while it is stalled. Even when the NW 1202 is sending data to the UE 1201 stalling the second IP connection results in stopping the PDU exchange between the NW 1202 and the UE 1201.

An alternative would be to not schedule the IP connections but the execution of the applications 1401, 1402 themselves. The OS 1403 might exclusively give its CPU resource to one of the involved applications 1401, 1402 to prevent simultaneous usage of the IP connections.

It is assumed that the functionality of the NAS/RRC discussed in context of FIG. 12 results in RRC state transitions of the stalled connection to low power states when the corresponding IP connection is stalled. As a consequence lower layer activity down to the PHY 1209 is reduced resulting in less RX and TX RF activity requested from the second wireless modem 1402 and thus less disturbance to the ongoing first IP connection. By certain scheduling the first connection is stalled next that allows the second connection to be un-stalled/resumed. In other words, the functionality may be used that when no data is transmitted and received for a certain time the PHY link is released by the NAS/RRC.

Different implementations of the A-MAC scheduler 1410 may be used:

Timer based simple round robin scheduling of the two connections with fixed time.

Data rate or application specific prioritization of the modem activation e.g. activating the higher priority first application/connection for 80% of the time while only using 20% for the second application/connection.

Insertion of guard periods that stalls both connections simultaneously before resuming a connection to avoid overlaps in the PHY activity caused by the RRC state transition latency.

Feedback like indicated in FIG. 14 (by dot and dash lines) from the wireless modems 1401, 1402 e.g. from the PHY 1208 to the A-MAC 1410 that makes the A-MAC 1410 aware of the RRC and/or PHY/RF state. In such an implementation the A-MAC 1410 can wait for a connection resume until it got feedback from the wireless modem that the RF resource has been freed.

FIG. 15 shows a flow diagram 1500 giving an example for a RF resource access scheduling by the A-MAC 1410.

In 1501, the first connection (by the first application 1401) is active, while the second connection (by the second application 1402) is stalled (or its establishment is delayed).

In 1502, it is assumed that based on one of the implementations described above, the A-MAC 1410 decides that the second application 1402 can resume (or start) data transmission (when the RF resource is free).

In 1503, the A-MAC 1410 stalls data transmission of the first application (i.e. data from the first application is not forwarded to lower layers).

It is assumed that in 1504, the first connection runs out of data (i.e. all data that the first application was allowed to send has been sent).

In 1505, the NAS/RRC of the first wireless modem 1408 releases the physical link of the first connection such that the RF resource is free to use for the second application/connection.

In 1506, the wireless modems' 1408, 1409 NAS/RRC or the PHY may optionally signal to the A-MAC 1410 that the RF resource is free.

In 1507, the A-MAC 1410 resumes the data transmission for the second application 1402.

In 1508, the data transmitted from the second application 1402 triggers that a physical link for a new second connection is set up by the NAS/RRC.

In 1509, the procedure returns to 1501 with the roles exchanged (i.e. second connection for second application 1402 is active, data transmission by the first application is stalled).

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:

1. A communication terminal comprising:
  a communication circuit for communicating over different communication networks;
  an application processor configured to execute a plurality of applications;
  a controller configured
    to receive, from each application of the plurality of applications, a respective request for an exchange of application layer data over a communication network associated with the respective application;
    to select, based on a predetermined criterion, a first application of the plurality of applications;
    to control the communication circuit to perform an exchange according to the request received from the first application over a first network layer communication connection to a communication network associated with the first application;
    to initiate, for a second application of the plurality of applications, a buffering, during the first network layer communication connection, of application layer data requested to be exchanged according to the request received from the second application;
    to control the communication circuit to release the first network layer communication connection based on a duration of the buffering; and
    to control the communication circuit to establish a second network layer communication connection to a communication network associated with the second application which is different from the communication network associated with the first application and perform an exchange according to the request received from the second application over the second network layer communication connection after release of the first network layer communication connection.

2. The communication terminal of claim 1, wherein the controller is configured to control the communication circuit to release the first network layer communication connection based on a level of a buffer buffering the application layer data requested to be exchanged according to the request received from the second application.

3. The communication terminal of claim 1, wherein the controller is configured to control the communication circuit to release the first network layer communication connection based on whether the duration of the buffering of the application layer data has reached a predetermined threshold.

4. The communication terminal of claim 3, wherein the controller is configured to set the predetermined threshold based on an allowable latency of the application layer data requested to be exchanged according to the request received from the second application.

5. The communication terminal of claim 1, wherein the application layer data requested to be exchanged according to the request received from the first application are data to be transmitted by the communication terminal and wherein the exchange of the application layer data requested to be exchanged according to the request received from the first application is sending the application layer data requested to be exchanged according to the request received from the first application.

6. The communication terminal of claim 1, wherein the application layer data requested to be exchanged according to the request received from the second application are data to be transmitted by the communication terminal and wherein the exchange of the application layer data requested to be exchanged according to the request received from the second application is sending the application layer data requested to be exchanged according to the request received from the second application.

7. The communication terminal of claim 6, wherein the communication terminal comprises a buffer and the controller is configured to initiate the buffering of the application layer data requested to be exchanged according to the request received from the second application in the buffer.

8. The communication terminal of claim 7, wherein the buffer is an application layer buffer.

9. The communication terminal of claim 1, wherein the application layer data requested to be exchanged according to the request received from the first application are data to be received by the communication terminal and wherein the exchange of the application layer data requested to be exchanged according to the request received from the first application is receiving the application layer data requested to be exchanged according to the request received from the first application.

10. The communication terminal of claim 1, wherein the application layer data requested to be exchanged according to the request received from the second application are data to be received by the communication terminal and wherein the exchange of the application layer data requested to be exchanged according to the request received from the second application is receiving the application layer data requested to be exchanged according to the request received from the second application from a communication device.

11. The communication terminal of claim 10, wherein the communication device comprises a buffer and the controller is configured to initiate the buffering of the application layer data requested to be exchanged according to the request received from the second application in the buffer.

12. The communication terminal of claim 11, wherein the buffer is an application layer buffer.

13. The communication terminal of claim 1, wherein the controller is configured to initiate, for a third application of the plurality of applications, a buffering, during the second network layer communication connection, of third application layer data requested to be exchanged according to the request received from the third application.

14. The communication terminal of claim 1, wherein the controller is configured to initiate a buffering, during the second network layer communication connection, of further application layer data requested to be exchanged according to the request received from the first application.

15. The communication terminal of claim 1, wherein the communication circuit comprises at least one of a radio frequency transceiver chain and a baseband processor supporting communication for a plurality of subscriber identity modules being installed in the communication terminal.

16. The communication terminal of claim 1, comprising a first subscriber identity module for providing communication connections to the first communication network and a second subscriber identity module for providing communication connections to the second communication network;

wherein the communication circuit is configured to communicate over communication connections provided via the first subscriber identity module and to communicate over communication connections provided via the second subscriber identity module.

17. The communication terminal of claim 1, wherein the communication circuit is configured to notify the controller when the first network layer communication connection and a corresponding usage of a radio frequency resource of the communication terminal has been released and a network layer communication connection to the second communication network has become available.

18. The communication terminal of claim 1, wherein the communication circuit is configured to establish the second network layer communication after a predetermined guard interval has expired since the release of the first network layer communication connection.

19. A method for communicating data comprising:
receiving, from each application of a plurality of applications executed on a communication terminal, a respective request for an exchange of application layer data over a communication network associated with the respective application;
selecting, based on a predetermined criterion, a first application of the plurality of applications,
performing an exchange according to the request received from the first application over a first network layer communication connection to a communication network associated with the first application;
buffering, for a second application of the plurality of applications, during the first network layer communication connection, of application layer data requested to be exchanged according to the request received from the second application;
releasing the first network layer communication connection based on a duration of the buffering;
establishing a second network layer communication connection to a communication network associated with the second application which is different from the communication network associated with the first application; and
performing an exchange according to the request received from the second application over the second network layer communication connection after release of the first network layer communication connection.

20. A computer readable medium having recorded instructions thereon which, when executed by a processor, make the processor perform a method for communicating data according to claim 19.

* * * * *